United States Patent [19]
Boardman et al.

[11] Patent Number: 5,952,409
[45] Date of Patent: Sep. 14, 1999

[54] COMPOSITIONS AND METHODS FOR IMPARTING STAIN RESISTANCE AND STAIN RESISTANT ARTICLES

[75] Inventors: Gail S. Boardman; Larry D. Boardman, both of Woodbury, Minn.

[73] Assignee: 3M Innovative Properties Company, St. Paul, Minn.

[21] Appl. No.: 08/666,518

[22] PCT Filed: Jan. 31, 1996

[86] PCT No.: PCT/US96/01238

§ 371 Date: Jul. 1, 1996

§ 102(e) Date: Jul. 1, 1996

[87] PCT Pub. No.: WO97/28304

PCT Pub. Date: Aug. 7, 1997

[51] Int. Cl.⁶ .................................................. C08J 5/00
[52] U.S. Cl. ........................... 524/185; 524/502; 524/542
[58] Field of Search ............................................. 524/185

[56] References Cited

U.S. PATENT DOCUMENTS

| | | | |
|---|---|---|---|
| 1,901,536 | 11/1933 | Schafer | 260/838 |
| 1,972,754 | 9/1934 | Biedermann | 260/3 |
| 1,988,985 | 9/1935 | Schafer | 149/5 |
| 2,112,361 | 6/1938 | Fischer | 260/4 |
| 2,171,806 | 8/1939 | Russell et al. | 260/49 |
| 2,985,633 | 5/1961 | Welch et al. | 260/85.3 |
| 3,019,114 | 1/1962 | Grantham | 106/13 |
| 3,141,862 | 7/1964 | Kirshenbaum et al. | 260/45.5 |
| 3,275,611 | 9/1966 | Mottus et al. | 260/80.5 |
| 3,340,193 | 9/1967 | Fields et al. | 252/56 |
| 3,405,001 | 10/1968 | Iler | 117/121 |
| 3,418,260 | 12/1968 | Trofimenko | 260/2 |
| 3,425,988 | 2/1969 | German et al. | 260/47 |
| 3,442,826 | 5/1969 | Dekking | 260/8 |
| 3,451,952 | 6/1969 | Slocombe | 260/2.5 |
| 3,455,853 | 7/1969 | Dekking | 260/17.4 |
| 3,467,488 | 9/1969 | Timmerman | 8/116 |
| 3,476,727 | 11/1969 | Lo Monaco et al. | 260/92.8 |
| 3,488,268 | 1/1970 | Tanner | 204/159.15 |
| 3,524,838 | 8/1970 | Imoto et al. | 260/88.3 |
| 3,527,737 | 9/1970 | Masuhara et al. | 260/78.5 |
| 3,552,911 | 1/1971 | Habib | 8/128 |
| 3,565,780 | 2/1971 | Zimmeran | 204/159.15 |
| 3,829,973 | 8/1974 | Masuhara et al. | 32/15 |
| 3,933,607 | 1/1976 | Needles et al. | 204/159.15 |
| 3,962,054 | 6/1976 | Wattiez et al. | 204/159.15 |
| 3,995,998 | 12/1976 | Rowland et al. | 8/115.6 |
| 4,043,982 | 8/1977 | O'Sullivan et al. | 260/47 |
| 4,063,885 | 12/1977 | Mares et al. | 8/115.7 |
| 4,167,616 | 9/1979 | Bollinger | 526/197 |
| 4,375,535 | 3/1983 | Kightlinger et al. | 527/313 |
| 4,379,728 | 4/1983 | Lin | 156/307.3 |
| 4,485,229 | 11/1984 | Waddill et al. | 528/111 |

(List continued on next page.)

FOREIGN PATENT DOCUMENTS

| | | |
|---|---|---|
| 649582 | 10/1993 | Australia . |
| 664459 | 6/1963 | Canada . |
| 2024600 | 3/1991 | Canada . |
| 2061021 | 10/1992 | Canada . |
| 0 051 796 | 11/1980 | European Pat. Off. . |
| 0 511 464 A1 | 11/1992 | European Pat. Off. . |
| 45-29195 | 9/1970 | Japan . |
| 46-16888 | 5/1971 | Japan . |
| 48-18928 | 6/1973 | Japan . |
| 53-102394 | 9/1978 | Japan . |
| 62-288675 | 12/1987 | Japan . |
| 3-177470 | 8/1991 | Japan . |
| 3-264509 | 11/1991 | Japan . |
| 93-235089 | 9/1993 | Japan .............................. A61K 6/00 |
| 413624 | 10/1932 | United Kingdom . |
| 904403 | 8/1962 | United Kingdom . |
| 988632 | 4/1965 | United Kingdom . |
| 1113722 | 5/1968 | United Kingdom . |
| 1132261 | 10/1968 | United Kingdom . |
| WO 92/07131 | 4/1992 | WIPO . |
| WO 95/22567 | 8/1995 | WIPO . |

(List continued on next page.)

OTHER PUBLICATIONS

The Trialkylborane–initiated Graft Copolymerization of Methyl Methacrylate onto Hemoglobin, K. Kojima, S. Iwabuchi and K. Kojima, *Bulletin of the Chemical Society of Japan*, vol. 44, pp. 1891–1895 (1971).

A New Method for the Graft Copolyermerization of Methyl Methacrylate onto Proteins and Fibers, *Polymer Letters*, vol. 9, pp. 25–29 (1971).

The Grafting of Methyl Methacrylate onto Cotton by Tri–n–butylborane, K. Kojima, S. Iwabuchi, K. Murakami, K. Kojima and F. Ichikawa, *Journal of Applied Polymer Science*, vol. 16, pp. 1139–1148 (1972).

Grafting of Vinyl Monomers by Tri–n–Butylborane onto Chlorophyll and Related Compounds, *Polymer Letters Edition*, vol. 13, pp. 361–363 (1975).

Tributylborane–Initiated Grafting of Methyl Methacrylate onto Chitin, K. Kojima, M. Yoshikuni and T. Suzuki, *Journal of Applied Polymer Science*, vol. 24, pp. 1587–1593 (1979).

Grafting of Methyl Methacrylate onto Silk Fibers Initiated by Tri–n–Butylborane, M. Tsukada, T. Yamamoto, N. Nakabayashi, H. Ishikawa and G. Freddi, *Journal of Applied Polymer Science*, vol. 43, pp. 2115–2121 (1991).

Molecular Weight Distribution of the Methyl Methacrylate (MMA) Polymer Separated from the MMA–Grafted Silk Fiber, M. Tsukada, Y. Goto, G. Freddi, T. Yamamoto and N. Nakabayashi, *Journal of Applied Polymer Science*, vol. 44, pp. 2197–2202 (1992).

(List continued on next page.)

*Primary Examiner*—Ana Woodward
*Attorney, Agent, or Firm*—Steven E. Skolnick

[57] ABSTRACT

A stainblocking composition comprises a stainblocking material and a complex of organoborane and amine. The stainblocking composition is particularly useful in imparting stain resistance to fibrous substrates that contain polyamide linkages, especially nylon carpet.

19 Claims, No Drawings

U.S. PATENT DOCUMENTS

| | | | |
|---|---|---|---|
| 4,501,591 | 2/1985 | Ucci et al. | 8/495 |
| 4,515,724 | 5/1985 | Ritter | 260/410 |
| 4,524,181 | 6/1985 | Adam et al. | 525/107 |
| 4,592,940 | 6/1986 | Blyth et al. | 428/96 |
| 4,638,092 | 1/1987 | Ritter | 568/1 |
| 4,639,498 | 1/1987 | Ritter | 526/196 |
| 4,656,229 | 4/1987 | Chiao | 525/518 |
| 4,676,858 | 6/1987 | Ritter | 156/307.3 |
| 4,680,212 | 7/1987 | Blyth et al. | 428/97 |
| 4,684,538 | 8/1987 | Klemarczyk | 427/54.1 |
| 4,721,751 | 1/1988 | Schappert et al. | 524/773 |
| 4,731,416 | 3/1988 | Saunders | 525/131 |
| 4,775,734 | 10/1988 | Goel | 528/89 |
| 4,822,373 | 4/1989 | Olson et al. | 8/115.6 |
| 4,833,009 | 5/1989 | Marshall | 428/267 |
| 4,857,392 | 8/1989 | Kirjanov et al. | 428/267 |
| 4,865,885 | 9/1989 | Herlant et al. | 427/322 |
| 4,874,814 | 10/1989 | Cartier et al. | 525/61 |
| 4,875,901 | 10/1989 | Payet et al. | 8/115.6 |
| 4,877,538 | 10/1989 | Kirjanov et al. | 252/8.7 |
| 4,883,839 | 11/1989 | Fitzgerald et al. | 525/136 |
| 4,892,558 | 1/1990 | Blyth et al. | 8/560 |
| 4,904,360 | 2/1990 | Wilson, Jr. et al. | 204/181.7 |
| 4,920,188 | 4/1990 | Sakashita et al. | 526/196 |
| 4,921,921 | 5/1990 | Ritter | 526/195 |
| 4,937,123 | 6/1990 | Chang et al. | 428/96 |
| 4,940,757 | 7/1990 | Moss, III et al. | 525/502 |
| 4,963,409 | 10/1990 | Liss et al. | 428/96 |
| 4,985,516 | 1/1991 | Sakashita et al. | 526/196 |
| 5,001,004 | 3/1991 | Fitzgerald et al. | 428/263 |
| 5,021,507 | 6/1991 | Stanley et al. | 525/127 |
| 5,055,541 | 10/1991 | Floyd et al. | 527/300 |
| 5,057,121 | 10/1991 | Fitzgerald et al. | 8/133 |
| 5,061,763 | 10/1991 | Moss, III et al. | 525/502 |
| 5,069,926 | 12/1991 | Iwata et al. | 427/40 |
| 5,073,442 | 12/1991 | Knowlton et al. | 428/267 |
| 5,074,883 | 12/1991 | Wang | 8/115.6 |
| 5,098,774 | 3/1992 | Chang | 428/267 |
| 5,106,928 | 4/1992 | Skoultchi et al. | 526/196 |
| 5,137,759 | 8/1992 | Vinod | 427/393.4 |
| 5,143,884 | 9/1992 | Skoultchi et al. | 502/160 |
| 5,212,727 | 5/1993 | Sargent et al. | 526/317.1 |
| 5,223,340 | 6/1993 | Moss, III et al. | 428/267 |
| 5,230,708 | 7/1993 | Hangey et al. | 8/115.6 |
| 5,236,464 | 8/1993 | Green et al. | 8/115.53 |
| 5,242,733 | 9/1993 | Windley | 428/97 |
| 5,286,821 | 2/1994 | Skoultchi | 526/196 |
| 5,310,828 | 5/1994 | Williams et al. | 525/502 |
| 5,310,835 | 5/1994 | Skoultchi et al. | 526/198 |
| 5,316,850 | 5/1994 | Sargent et al. | 428/378 |
| 5,376,746 | 12/1994 | Skoultchi | 526/196 |
| 5,401,805 | 3/1995 | Chung et al. | 525/288 |
| 5,460,887 | 10/1995 | Pechhold | 428/395 |
| 5,460,891 | 10/1995 | Buck et al. | 428/477.4 |
| 5,539,070 | 7/1996 | Zharov et al. | 526/198 |

OTHER PUBLICATIONS

Synthesis of Functionalized Polypropylene and Polypropylene–Polymethylmethacrylate Graft Copolymer, D. Rhubright and T.C. Chung, Proceedings of the American Chemical Society, *Polymeric Materials Science and Engineering*, vol. 67, pp. 112–113 (1992).

Polymerization of Acrylonitrile in Presence of Tributylborine, G. Kolesnikov and L. Fedorova, translated from *Bull. Acad. Sci. USSR, Div. Chem. Sci.*, p. 236 (1957).

Tributylborine: A Catalyst for the Polyermization of Unsaturated Compounds, G. Kolesnikov and N.V. Klimentova, translated from *Bull. Acad. Sci. USSR, Div. Chem. Sci.*, p. 653 (1957).

Triethlboron as an Initiator for Vinyl Polmerization, J. Furukawa, T. Tsuruta and S. Inoue, *Journal of Polymer Science*, vol. XXVI, Issue No. 113, pp. 234–236 (1957).

Oxygen Compounds as Cocatalyst for Triethylboron–Catalyzed Vinyl Polymerization, J. Furukawa and T. Tsuruta, *Journal of Polymer Science*, vol. XXVIII, Issue No. 116, pp. 227–229 (1958).

Mechanism of the Polymerization of Acrylonitrile in Presence of Tributylborine, G. Kolesnikov and L. Fedorova, translated from *Bull. Acad. Sci. USSR, Div. Chem. Sci.*, p. 906 (1958).

Mechanism of Trialkylboron Initiated Polymerization, J. Fordham and C. Sturm, *Journal of Polymer Science*, vol. XXXIII, No. 126, pp. 503–504 (1958).

Cocatalytic Activity of Some Metal Salts on Vinyl Polmerization with Tributhylboron, I. M. Panayotov, *Comptes rendus de l'Academie bulgare des Sciences*, vol. 14, No. 2, pp. 147–150 (1961).

Polymerization with Organoboron Compounds, F. Arimoto, *Journal of Polymer Science: Part A–1*, vol. 4, pp. 275–282 (1966).

On the Existence of a Free–Radical Organoboron Complex in the Polymerization of Methyl Methacrylate, R. Kern and J. Schaefer, *Polymer Letters*, vol. 5, pp. 157–162 (1967).

Vinyl Monomer Polymerization Mechanism in the Presence of Trialkylboranes, J. Grotewold, E. Lissi and A. Villa, *Journal of Polymer Science: Part A–1*, vol. 6, pp. 3157–3162 (1968).

Free–Radical Polymerization of Methyl Methacrylate in the Presence of Trialkylboranes, P. Brindley and R. Pearson, *Polymer Letters*, vol. 6, pp. 831–835 (1968).

Ethylene Polymerization in Presence of Tributylboron, G. Kolesnikov and T. Soboleva, *Scientific and Research Publications of the Members of the All Union Chemical Society Name After Mendilev*, vol. 2, p. 663 (1957).

Studies on Dental Self–Curing Resins (II), S. Fujisawa, Y. Imai and E. Masuhara, *Reports of the Institute for Medical & Dental Engineering*, vol. 3, pp. 64–71 (1969).

Free–Radical Copolymerization of 1,2–Dichloroethylenes. Evidence for Chain Transfer by Chlorine Atom Elimination, T. Dawson, R. Lundberg and F. Welch, *Journal of Polymer Science: Part A–1*, vol. 7, pp. 173–181 (1969).

Mechanism of Vinyl Monomer Polymerization in the Presence of Trialkylboranes and Inhibitors, E. Aranchibia et al., *Journal of Polymer Science: Part A–1*, vol. 7, pp. 3430–3433 (1969).

Polymerization of Methyl Methacrylate by Trialkylborane–Pyridine System, K. Kojima et al., *Polymer Letters*, vol. 8, pp. 541–547 (1970).

Polymerization Initiated by Triethylborane–Peroxide Mixtures, E. Abuin et al., *Polymer Letters*, vol. 7, pp. 515–518 (1970).

Polymerization of Methyl Methacrylate by Co–ordination Compounds of Tri–n–butylborane with Some Electron–donating Compounds, Kojima et al., *Research Report of the Chiba University Faculty of Engineering*, vol. 22, No. 41, pp. 47–55.

Polymerization of Methyl Methacrylate Initiated by Tri–n–butylborane–Organic Halide Systems, M. Yoshikuni, M. Asami, S. Iwabuchi and K. Kojima, *Journal of Polymer Science*, vol. 11, pp. 3115–3124 (1973).

Polymerization of Methyl Methacrylate Initiated by Tributylborane–Pyridine System, Kojima et al., *Journal of the Japanese Chemical Society*, No. 11, pp. 2165–2171 (1972).

The Copolymerization of Vinylhydroquinone and Acrylonitrile by Tri–n–butylborane, S. Iwabuchi, M. Ueda, M. Kobayashi and K. Kojima, *Polymer Journal*, vol. 6, No. 2, pp. 185–190 (1974).

Free Radical Polymerization in the Presence of Triethylborane, E. Abuin, J. Cornejo and E. Lissi, *European Polymer Journal*, vol. 11, pp. 779–782 (1975).

Polymerization of Methyl Methacrylate by tri–n–butylborane in the presence of amino acid esters, K. Kojima, S. Iwabuchi, Y. Moriya and M. Yoshikuni, *Polymer*, vol. 16, pp. 601–604 (1975).

Analysis of Mechanism of Radical Formation Resulted from the Initiator System of Triethylboron and Oxygen by Spin Trapping Technique, Sato et al., *Journal of the Japanese Chemical Society*, No. 6, pp. 1080–1084 (1975).

Development of Adhesive Pit and Fissure Sealants Using a MMA Resin Initiated by a Tri–n–butyl Borane Derivative, N. Nakabayashi and E. Masuhara, *Journal of Biomedical Materials Research*, vol.12, pp. 149–165 (1978).

Vinyl Acetate Polymerization Initiated by Alkylborane–oxidizer–type Systems, S. Ivanchev, L. Shumnyi and V. Konovalenko, *Polymer Science U.S.S.R.*, vol. 22, No. 12, pp. 3000–3006 (1980).

Preparation of Hard Tissue Compatible Materials: Dental Polymers, N. Nakabayashi and E. Masuhara, *Biomedical Polymers*, pp. 85–111 (1980).

Mechanism of Initiation of Polymerization of Vinyl Monomers by Means of the Trialkylborane–Acid System, S. Ivanchev and L. Shumnyi, translated from Doklady Akademii Nauk SSSR, vol. 270, No. 5, pp. 1127–1129 (1983).

Effect of Organic Bases on Initiating Properties in the System Boronalkylelemental Organic Peroxide During Vinylchloride Polymerizatoin, T. Guzanova, Master Thesis of the Fifth (graduate) year student, Ministry of High and Secondary Special Education Russia, Gorky State University (1983).

Application of Spin Trapping Technique to Radical Polymerization, 20, T. Sato, N. Fukumura and T. Otsu, *Makromol. Chem.*, 184, pp. 431–442 (1983).

Importance of Polymerization Initiator Systems and Interfacial Initiation of Polymerization in Adhesive Bonding of Resin to Dentin, Y. Imai, Y. Kadoma, K. Kojima, T. Akimoto, K. Ikakura and T. Ohta, *J. Dent. Res.*, vol. 70, No. 7, pp. 1088–1091 (1991).

Vibrational Analysis by Raman Spectroscopy of the Interface Between Dental Adhesive Resin and Dentin, M. Suzuki, H. Kato and S. Wakumoto, *J. Dent. Res.*, vol. 70, No. 7, pp. 1092–1097 (1991).

Laser–Raman Spectroscopic Study of the Adhesive Interface Between 4–MET/MMA–TBB Resin and Hydroxyapatite or Bovine Enamel, M. Ozaki, M. Suzuki, K. Itoh and S. Wakumoto, *Dental Materials Journal*, vol. 10, No. 2, pp. 105–120 (1991).

Polymerization of Some Vinyl Monomers on Triisobutylboron–Containing Radical Initiators in the Presence of Hydroquinone and Benzoquinone, V. Dodonov and D. Grishin, *High Molecular Compounds*, vol. 35, No. 3, pp. 137–141 (1993).

Synthesis of PP–g–PMMA, PP–g–PVA and PP–g–PCL Copolymers, D. Rhubright and T. Chung, American Chemical Society, Division of Polymer Chemistry, Papers Presented at the Chicago, Illinois Meeting, vol. 34, No. 2, pp. 560–561 (1993).

Functionalized and Grafted Polyolefin Copolymers Prepared by Tansition Metal Catalysts and Borane Monomers, T. Chung, *Polymer Reprints*, vol. 35, No. 1, pp. 674–675 (1994).

Photochemical Modification of Fluorocargon Resin Surface to Adhere with Epoxy Resin, M. Okoshi, T. Miyokawa, H. Kashiura and M. Murahara, *Mat. Res. Soc. Symp. Proc.*, vol. 334, pp. 365–371 (1994).

Chemical Abstract No. 88532r, *Chemical Abstracts*, vol. 73, 1970.

Chemical Abstract No. 134385q, *Chemcial Abstracts*, vol. 80, 1974.

COMPOSITIONS AND METHODS FOR IMPARTING STAIN RESISTANCE AND STAIN RESISTANT ARTICLES

BACKGROUND OF THE INVENTION

1. Field of the Invention

This invention relates generally to compositions that impart stain resistance to substrates that have been treated with the compositions. The invention further relates to methods for imparting stain resistance to the substrates by treating them with these compositions, and to the articles that have been treated with the compositions. More specifically, this invention relates to the use of organoborane amine complexes to provide compositions that impart stain resistance, as well as to methods for imparting stain resistance using these complexes, and to articles (especially carpet) that have been treated with compositions that incorporate these complexes.

2. Description of the Related Art

Fibrous substrates (e.g., fabrics, textiles and carpets) are often treated with compositions that provide stain resistance. These compositions, sometimes referred to herein as stain-blocking compositions or stainblockers, prolong the useful life of fabrics and textiles by rendering them more resistant to staining by food and other materials. One well-known use of stainblockers is for treating carpet. It has been reported that most carpet is replaced because of unsightly stains rather than physical wear.

Rendering nylon carpet resistant to staining is particularly important. Nylon fiber is commonly used to manufacture carpet because it has many desirable qualities. It is durable, comfortable and provides warmth. It can be made into carpet having a wide variety of textures, colors and patterns. However, nylon carpet can be readily, if not permanently, stained by various natural and artificial colorants found in foods such as coffee, mustard, wine and soft drinks. An artificial colorant for food known as "Red Dye No. 40" (sometimes called FD&C Red Dye No. 40 or C.T. Food Red 17) has been reported to actually dye and, therefore, permanently stain, nylon carpet fiber within minutes after a food containing this dye has been spilled on the carpet.

Consequently, there has been considerable effort to provide compositions that will impart stain resistance to nylon fiber carpet. For example, U.S. Pat. No. 4,822,373 (Olson et al., assigned to Minnesota Mining and Manufacturing Company) discloses a method of providing fibrous polyamide substrates (such as nylon carpet) with resistance to staining by acid colorants. A composition comprising (a) a partially sulfonated novolak resin; and (b) polymethacrylic acid, copolymers of methacrylic acid, or combinations thereof is applied to the carpet.

A stain resistant composition for polyamide fibers that is prepared by polymerizing an α-substituted acrylic acid or ester in the presence of a sulfonated aromatic formaldehyde condensation polymer is described in U.S. Pat. No. 5,061,763 (Moss, III et al., assigned to Peach State Labs, Inc.). Also described in this patent is a stain resistant composition prepared by (1) esterification of an acrylic acid with a sulfonated hydroxyaromatic compound followed by (2) polymerization of the acrylic acid.

U.S. Pat. No. 4,892,558 (Blyth et al., assigned to Monsanto Company) describes nylon fibers that resist staining by acid dye colorants. The nylon fibers are spin finish coated with a stainblocker that can be prepared by the condensation of formaldehyde with one or more phenols.

U.S. Pat. No. 4,963,409 (Liss et al., assigned to E. I. du Pont de Nemours and Company) describes imparting stain resistance to polyamide substrates by using sulfonated phenol-formaldehyde products in which a portion of the free hydroxyl groups have been acylated or etherified. U.S. Pat. No. 5,001,004 (Fitzgerald et al., also assigned to Dupont) discloses polyamide textile substrates treated with a non-sulfonated stain-resistant composition comprising hydrolyzed ethylenically unsaturated aromatic/maleic anhydride polymers. A composition that is said to impart stain resistance to polyamide textile substrates and containing a sulfonated phenol-formaldehyde condensation product, and a hydrolyzed polymer of maleic anhydride and one or more ethylenically unsaturated aromatic monomers is described in U.S. Pat. No. 4,883,839 (Fitzgerald et al., also assigned to Dupont).

U.S. Pat. No. 4,865,885 (Herlant et al., assigned to Crompton & Knowles Corporation) describes an agent that is reportedly useful in preventing nylon fibers from being permanently stained by food colors. The agent is obtained by adding a sulfonated phenol-formaldehyde or naphthol-formaldehyde to an anionic surfactant.

U.S. Pat. No. 5,073,442 (Knowlton et al., assigned to Trichromatic Carpet, Inc.) discloses a method of enhancing the soil-and/or stain-resistant characteristics of polyamide fabrics by applying a solution containing, in a variety of combinations: sulfonated phenolic resins, sulfonated aromatic compounds, compounds of sulfonated phenolics; and aldehydes, modified wax emulsions, fluorochemicals, acrylics, and organic acids of low molecular weight.

However, there is still a need for stainblocking compositions having even improved properties. It would be advantageous if such compositions could provide either enhanced stain resistance at concentrations of stainblocker that are equivalent to those conventionally used (as this would yield improved performance), or equivalent performance at concentrations of stainblocker that are less than conventionally used (as this could reduce manufacturing costs since less stainblocker would be needed).

It would also be advantageous if the stainblocking compositions retained their effectiveness after the carpet has been cleaned. It has been reported that steam cleaning carpets can reduce the efficacy of a previously applied stainblocking composition. Consumer-applied stainblocking treatments that are available to revitalize carpet provide only a partial solution because commercial treatments are usually applied by the carpet mill in a steaming process that is difficult for consumers to effectively duplicate. Thus, a stainblocking composition that can be easily and effectively applied by consumers would be highly desired.

Many stainblocking compositions, in order to achieve maximum effectiveness, are applied at a very low pH of about 3 or less (i.e., highly acidic conditions). However, the manufacturer of the stainblocking composition will often ship it to an end user (e.g., a carpet mill) at a pH of about 4 or higher so as to reduce the corrosive effects that highly acidic compositions can have on the shipping containers (e.g., drums, tank cars, etc.). This not only complicates the handling of the stainblocking composition, it also raises the cost of manufacturing and using it. The manufacturer of the stainblocking composition will often add an alkaline material to raise the pH so that the stainblocking composition can be more easily shipped. The user then acidifies the stainblocking composition so that it can be applied with the best effectiveness. However, the user's resulting waste stream also becomes highly acidic, and frequently alkali must be added to the waste stream so that it can be discharged into a municipal sewer system.

Thus, it would also be advantageous to have a stainblocking composition that could be effectively used at a higher pH. This would not only provide a more environmentally acceptable composition, it would also reduce or eliminate the need for special handling requirements before shipping, using or disposing of the stainblocking composition.

SUMMARY OF THE INVENTION

In general, this invention relates to compositions (or systems) that impart stain resistance to substrates (for example fibrous substrates such as fabric, textiles and carpet) that have been treated with the compositions. Such compositions are sometimes referred to herein as stainblocking compositions, stainblocking systems or stainblockers. In one broad aspect, the invention provides a stainblocking system that comprises a stainblocking material, and a complex of organoborane and amine.

A wide variety of stainblocking materials may be used in the stainblocking compositions of the invention. Included among the useful materials are sulfonated aromatic polymers, polymers that are derived from at least one or more (α-and/or β-substituted) acrylic acid monomers, and hydrolyzed copolymers of at least one or more ethylenically unsaturated monomers and maleic anhydride. Also useful as stainblocking materials are blends of at least two or more of these polymers, reaction products of at least two or more of the monomers from which these polymers may be derived, reaction products of at least one or more of the monomers from which the polymers may be derived and at least one or more of the polymers, and materials obtained by polymerizing at least one or more of the monomers in the presence of one or more of the polymers.

Sulfonated aromatic polymers are a preferred stainblocking material. Desirable examples may comprise a condensation polymer of an aldehyde (e.g., formaldehyde or acetaldehyde) and a sulfonated aromatic compound, or a subsequently sulfonated condensation polymer of an aldehyde and an aromatic compound. Various sulfonated aromatic compounds are available for use in the stainblocking compositions of the invention. However, among the most preferred materials are those which include hydroxyl functionality such as bis(hydroxy phenyl sulfone), hydroxy benzenesulfonic acid, hydroxynaphthalenesulfonic acid, sulfonated 4,4'-dihydroxydiphenylsulfone, and blends thereof Other useful sulfonated aromatic polymers comprise a copolymer of an ethylenically unsaturated aromatic monomer (e.g., styrene) and a sulfonated ethylenically unsaturated aromatic monomer (e.g., styrene sulfonate).

Another preferred class of stainblocking materials are polymers derived from at least one or more (α-and/or β-substituted) acrylic acid monomers. These monomers have the general structure $HR^1C=C(R)COOX$, wherein R and $R^1$ are independently selected from hydrogen, organic radicals and halogens, and X is independently selected from hydrogen, organic radicals and cations. Particularly preferred examples of the resulting polymers are acrylic polymers; i.e., polyacrylic acid, copolymers of acrylic acid and one or more other monomers that are copolymerizable with acrylic acid, and blends of polyacrylic acid and one or more acrylic acid copolymers. Even more preferred, however, are methacrylic polymers which includes polymethacrylic acid, copolymers of methacrylic acid and one or more other monomers that are copolymerizable with methacrylic acid, and blends of polymethacrylic acid and one or more methacrylic acid copolymers.

A third preferred class of stainblocking materials are hydrolyzed copolymers of at least one or more ethylenically unsaturated monomers and maleic anhydride. The ethylenically unsaturated monomers can be alpha-olefin type monomers (e.g. 1-alkenes) or, more preferably, aromatic monomers such as styrene.

Quite useful stainblocking materials may be obtained by blending together two or more polymers selected from among the different general classes of polymers described above, reacting together at least two or more monomers from which the different general classes of polymers are derived, reaction products of at least one or more of the monomers from which the polymers may be derived and at least one or more of the polymers, or by polymerizing at least one or more of the monomers in the presence of one or more of the polymers.

For example, one or more (α-and/or β-substituted) acrylic acid monomers may be polymerized together and, subsequent to the polymerization, blended with a sulfonated aromatic polymer. Alternatively, the (α-and/or β-substituted) acrylic acid monomers can be polymerized in the presence of a sulfonated aromatic polymer.

In another example, a hydrolyzed copolymer of ethylenically unsaturated monomer and maleic anhydride may be combined with a sulfonated aromatic polymer, and, optionally, a polymer derived from at least one or more (α-and/or β-substituted) acrylic acid monomers.

The presence of the organoborane amine complex substantially improves the ability of the stainblocking material to impart stain resistance to a substrate that has been treated with the stainblocking material. Typically, about 1 to 70 parts of the complex is combined with 100 parts of stainblocking material, although amounts of about 5 to 20 parts are more preferred.

Useful organoboranes for the complex may be represented by the general structure

wherein $R^1$ is an alkyl group having 1 to 18 (preferably 1 to 10) carbon atoms, and $R^2$ and $R^3$ are independently alkyl groups having 1 to 18 (preferably 1 to 10) carbon atoms or phenyl-containing groups. More preferably, $R^1$, $R^2$ and $R^3$ are each independently selected from alkyl groups having 1 to 5 carbon atoms.

A wide variety of amines may be complexed with the organoborane including primary monoamines, secondary monoamines, polyamines containing a primary amine or a secondary amine, selected heterocyclic tertiary polyamines, and ammonia. Examples of useful polyamines include diamines having the structure $H_2N-R-NH_2$ in which R is a divalent, organic radical comprised of an alkylene, arylene or alkylenearylene group. Also useful are polyoxyalkylenepolyamines having either the structure $H_2NR^1O-(R^2O)_w-(R^3O)_x-R^2O)_y-R^1NH_2$ or the structure $[H_2NR^1O-(R^2O)_w]_z-R^4$ wherein $R^1$, $R^2$ and $R^3$ are each independently selected from alkylene groups having 1 to 10 carbon atoms, $R^4$ is the residue of a polyol used to prepare the polyoxyalkylenepolyamine, the value of w is $\geq 1$, the value of x is $\geq 0$, the value of y is $\geq 0$, and the value of z is $>2$. Another useful class of polyamines are those which comprise the condensation reaction product of a diprimary amine-terminated material (i.e., a material having two terminal groups that are primary amine), and a material containing at least two groups reactive with primary amine.

Also useful as polyamines are heterocyclic diamines in which both amine groups are within the heterocyclic structure. Useful examples of such materials may be represented by the general structure

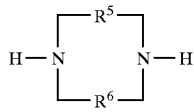

in which $R^5$ and $R^6$ are alkylene groups which preferably cooperate to form, with the two nitrogen atoms, a 5 to 8-membered ring.

The stainblocking compositions of the invention can be used to impart stain resistance to a wide variety of fibrous substrates that contain polyamide linkages, including fabrics, textiles and carpets. Nylon carpet is particularly preferred as a substrate. Thus, in another broad aspect, the invention relates to a fibrous polyamide linkage-containing substrate that has been treated with a stainblocking composition according to the invention, especially where the fibrous substrate is nylon carpet, a substrate that is susceptible to permanent staining by acid colorants found in many foods.

The invention also provides for a method of imparting stain resistance to a fibrous substrate by applying a stainblocking composition according to the invention to the fibrous substrate. A wide variety of application methods are available including the use of dyeing techniques conventionally used to dye fibrous substrates, immersing, padding, foaming, and spin finishing.

In another embodiment, the invention provides a method for improving the ability of an existing stainblocking material to impart stain resistance to a fibrous substrate that has been treated with the stainblocking material. An organoborane amine complex is added to the existing stainblocking material. The presence of the complex also permits the use of less stainblocking material without decreasing the effectiveness of the stainblocking material in providing stain resistance. Thus, in still another embodiment, the invention provides for a method of reducing the amount of stainblocking material that is needed to impart a desired degree of stain resistance to a substrate that is treated with the stainblocking material.

Advantageously, the presence of the organoborane amine complex permits the stainblocking material to be applied to a substrate at a higher pH than is typically done, while still imparting excellent stain resistance to the substrate. Thus, in another embodiment, the invention also relates to a method of raising the pH at which an aqueous stainblocking material may be applied to a substrate to impart stain resistance thereto. The method is accomplished by adding an organoborane amine complex to the aqueous stainblocking material.

DETAILED DESCRIPTION OF THE PREFERRED EMBODIMENTS

In one aspect, this invention relates to compositions (or systems) that impart stain resistance to substrates that are treated with the compositions. Such compositions are sometimes referred to herein as stainblocking compositions, stainblocking systems or stainblockers. A wide variety of substrates may be treated with the stainblocking compositions of the invention, although they are particularly useful on carpet (especially nylon carpet).

The stainblocking compositions of the invention are typically aqueous systems that comprise (and, more preferably, consist essentially of) one or more stainblocking materials, and a complex of organoborane and amine. As used herein, a "stainblocking material" refers to a material which, when applied to a substrate, enhances the ability of the substrate to resist staining, for example, by natural or artificial colorants found in food or other household items. Preferably, the stain resistance is accomplished without permanently and visibly changing (to the unaided eye) the color of the substrate, except for a slight yellowing of the substrate that is associated with the use of some known stainblocking materials, although it is most preferred that no permanent and visible yellowing of the substrate occur. It is also preferred that the stainblocking composition not change the texture or the feel of the substrate to which it has been applied. The stainblocking compositions of the invention are typically clear to slightly turbid materials having a waterlike viscosity at room temperature and possessing anionic solubilizing functionality to promote dissolution or dispersion in water.

Stainblocking Materials

A wide variety of stainblocking materials are useful in the stainblocking compositions of the invention. Included among such stainblocking materials are sulfonated aromatic polymers, polymers derived from at least one or more (α-and/or β-substituted) acrylic acid monomers, and hydrolyzed polymers of maleic anhydride and at least one or more ethylenically unsaturated monomers. Also included among the stainblocking materials are blends of at least two or more of the foregoing polymers, reaction products of at least two or more of the monomers from which these polymers may be derived, reaction products of at least one or more of the monomers from which the polymers may be derived and at least one or more of the polymers, and materials obtained by polymerizing at least one or more of the monomers in the presence of one or more of the polymers.

By "monomer" is meant a polymerizable single unit (typically of low molecular weight) that provides repeating units in the ultimate polymer, as well as partially reacted materials that can still participate in a polymerization reaction so as to provide repeating units in the ultimate polymer. The expression "at least" recognizes, as explained below, that monomers in addition to those mentioned may participate in the polymerization.

Sulfonated aromatic polymers useful in the invention may be obtained by condensation polymerizing an aldehyde with a sulfonated aromatic compound, the resulting polymer sometimes being referred to herein as either a sulfonated aromatic condensation polymer or as a condensation polymer. The resulting condensation polymer should contain a significant number of sulfonate groups. Preferably, at least one sulfonate group is attached to at least 30% of the monomeric units of the condensation polymer, more preferably between 30% and 70% of the monomeric units. It is also preferred that the resulting condensation polymer be substantially soluble in water to simplify handling and application of the stainblocking composition to a substrate at normal temperatures (about room temperature to 100° C., where "room temperature" refers to a temperature of about 20 to 25° C.).

The sulfonated aromatic polymer should have an effective sulfonic acid equivalent weight. By an "effective sulfonic acid equivalent weight" is meant an equivalent weight that is sufficient to impart stain resistance to a substrate treated with the stainblocking composition, while rendering the stainblocking composition sufficiently water soluble or water dispersible to permit application to a substrate at normal temperatures (typically about room temperature to 100° C.). Within these guidelines, the sulfonic acid equivalent weight is preferably about 300 to 1,200, more preferably, about 400 to 900.

Any aldehyde that can be condensation polymerized with a sulfonated aromatic compound may be used in the invention. Suitable examples of such aldehydes include acetaldehyde, benzaldehyde, furfuraldehyde, and, most preferably, formaldehyde. Suitable sulfonated aromatic compounds for forming the condensation polymer include monomers such as benzene sulfonic acid (which, in general, may contain various combinations of alkyl, hydroxy and alkoxy substituents), toluene sulfonic acid, xylene sulfonic acid (e.g., 2,4-dimethyl benzene sulfonic acid), phenyl 4-sulfonic acid, cumene sulfonic acid, dodecylbenzene sulfonic acid, sulfonated diphenyl ether, benzaldehyde sulfonic acid, aminobenzene sulfonic acid, alkoxybenzenesulfonic acid, benzophenone sulfonic acid, sulfonated derivatives of styrene, dodecyl diphenyloxide disulfonic acid, sulfonated derivatives of naphthalene (e.g., naphthalene sulfonic acid), which derivatives may generally contain various combinations of alkyl, hydroxy and alkoxy substituents such as, alkylnaphthalene sulfonic acid (e.g., methylnaphthalene sulfonic acid) and alkoxynaphthalene sulfonic acid.

Including hydroxyl functionality in the sulfonated aromatic compound may enhance its solubility in water. Hydroxyl functionality may be introduced into the sulfonated aromatic compound (so as to form a sulfonated hydroxyaromatic compound) by either sulfonating a phenolic compound, or by polymerizing the aldehyde and the sulfonated aromatic compound with a hydroxyaromatic material (preferably a phenolic compound). Phenolic compounds useful in either approach include phenol, halogenated phenol (e.g., chlorophenol or trifluoromethylphenol), naphthol, dihydroxydiphenylsulfide, resorcinol, catechol, hydroxyarylcarboxylic acid (e.g., salicylic acid), hydroxyphenylphenyl ether, phenylphenol, alkylphenol (e.g., nonylphenol or cresol), dihydroxydiphenylsulfone, and bis(hydroxyphenyl)alkane (e.g., 2,2-bis(hydroxyphenyl) propane or 2,2,-bis(hydroxyphenyl)hexafluoropropane). Resulting materials include sulfoalkylated phenol, (e.g., sulfomethylated dihydroxydiphenyl sulfone). Particularly preferred sulfonated hydroxyaromatic compounds include bis(hydroxyphenyl)sulfone, hydroxybenzenesulfonic acid, hydroxynapthalenesulfonic acid, and sulfonated 4,4'-dihydroxydiphenylsulfone.

Enhanced solubility in water may also be obtained by providing the sulfonated aromatic compound as a salt based on, for example, sodium, potassium, or ammonium, such as sodium xylene sulfonate, ammonium xylene sulfonate, sodium toluene sulfonate, sodium cumene sulfonate, ammonium cumene sulfonate, potassium toluene sulfonate, potassium cumene sulfonate, and potassium xylene sulfonate.

Particularly preferred condensation polymers consist essentially of repeating units of the formula

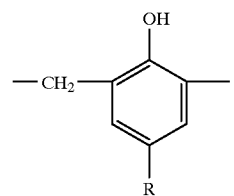

where R is the same or different in each unit, and is either hydrogen or a radical selected from the group consisting of —SO₃X,

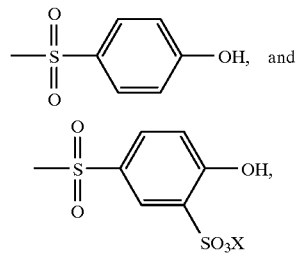

where X is hydrogen or a cation such as sodium or potassium, provided that the resulting polymer contains a sufficient number of sulfonate groups (typically at least 30%). Even more preferred are condensation polymers having these structures and which are water soluble, have at least 40% of the repeating units containing an —SO₃X radial, and have at least 40% of the repeating units containing the group

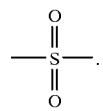

Sulfonated aromatic condensation polymers useful in the invention are described in U.S. Pat. No. 4,680,212 (Blyth et al.), U.S. Pat. No. 4,875,901 (Payet et al.), U.S. Pat. No. 4,940,757 (Moss, III et al.), U.S. Pat. No. 5,061,763 (Moss, III et al.), U.S. Pat. No. 5,074,883 (Wang), and U.S. Pat. No. 5,098,774 (Chang).

Sulfonated aromatic condensation polymers useful in the invention can be prepared by methods known to those skilled in the art. Sulfonation of phenolic compounds is described in, for example, *Sulfonated and Related Reactions*, E. E. Gilbert, Interscience Publishers, 1965. Methods of preparing condensation polymers of sulfonated aromatic compounds with formaldehyde are described in U.S. Pat. No. 1,901,536 (Schafer), U.S. Pat. No. 1,972,754 (Biedermann), U.S. Pat. No. 1,988,985 (Schafer), U.S. Pat. No. 2,112,361 (Fischer), U.S. Pat. No. 2,171,806 (Russell, et al.), U.S. Pat. No. 4,680,212 (Blyth et al.), U.S. Pat. No. 4,940,757 (Moss, III et al.), U.S. Pat. No. 5,061,763 (Moss, III et al.), and *Phenolic Resins*, A. Knopf et al., Springer-Verlag, 1985.

In general, an aromatic compound such as phenol, naphthalene or naphthol is sulfonated, for example by reacting it with a sulfonating compound such as sulfuric acid, chlorosulfonic acid or alkaline sulfite so as to form a sulfonated aromatic compound. The sulfonated aromatic compound is then condensation polymerized with formaldehyde or other aldehyde, typically under acidic conditions. Mixtures of different sulfonated aromatic compounds can also be polymerized. Typically, one mole of sulfonated aromatic compound is reacted with 0.3 to 0.5 mole of aldehyde. The sulfonated aromatic condensation polymer can be subsequently reacted with a base (e.g., sodium hydroxide, potassium hydroxide, or ammonium hydroxide) so as to form a sulfonic acid salt. Currently marketed condensation polymers are typically sold as a sodium sulfonate salt.

Alternatively, a sulfonated aromatic condensation polymer may be prepared by reacting an unsulfonated hydroxy aromatic compound (e.g., a phenolic compound such as phenol, naphthol, etc.) with an aldehyde such as formaldehyde and then sulfonating the resulting condensation polymer by treatment with fuming sulfuric acid.

Examples of useful, commercially available sulfonated aromatic condensation polymers include Erional™ NW (Ciba-Geigy Limited; containing a naphthalene sulfonic acid polymer with formaldehyde and 4,4'-dihydroxydiphenylsulfone), Erional™ PA (polymer of phenol sulfonic acid, formaldehyde, and 4,4' dihydroxydiphenyl sulfone from Ciba-Geigy), 3M™ brand stain release concentrate FX-369™ (3M Co.), Tamol™ SN (Rohm & Haas Co.), Mesitol™ NBS (Bayer AG), Nylofixan™ P (containing a formaldehyde condensation copolymer of 4,4'-dihydroxydiphenylsulfone and 2,4-dimethylbenzenesulfonic acid, manufactured by Sandoz Corp.), and Intratex™ N (Crompton & Knowles Corp.). The sulfonated aromatic polymers are typically purchased commercially as a 30 to 40% solids aqueous solution that can contain other compounds, including aromatic sulfonic acids and glycols.

The effectiveness of a sulfonated aromatic condensation polymer in imparting stain resistance to a substrate may be improved by providing the condensation polymer in the form of a divalent metal salt. These salts are water soluble and are substantially free of sulfonic acid moieties (i.e., $—SO_3H$ groups); that is, they typically contain less than i mole percent sulfonic acid moieties. The salt form of the polymer may be obtained by reacting the condensation polymer with a divalent metal oxide or hydroxide, or the divalent metal salt of a weak acid (e.g., carbonic acid, boric acid, or a carboxylic acid) so as to form an aqueous solution having a pH of at least 3. In another approach, a sulfonated aromatic compound that is used to prepare the condensation polymer may first be converted to a salt (by using a divalent metal oxide or hydroxide, or a divalent metal salt of a weak acid) before reaction with an aldehyde to yield the salt form of the polymer. Suitable divalent metal oxides or hydroxides include oxides and hydroxides of calcium, magnesium and zinc. Divalent metal salts of weak acids include carbonates, bicarbonates, acetates, formates and borates of calcium, magnesium and zinc. Even further improvements in stain resistance may be achieved by adding small amounts (less than 0.1% SOF, more preferably less than 0.05% SOF) of a divalent metal salt (such as those discussed in the additives section below) to the salt form of the polymer. (% SOF refers to the % solids based on the weight of the fibrous substrate.) Such techniques are described in U.S. Pat. No. 5,098,774 (Chang).

Silicates are another useful additive for obtaining improved stain resistance. Silicates that may be used in the invention have the formula $M_2O_m(SiO_2)$, where M is an alkali metal such as sodium or potassium, and the value of m is about 0.5 to 2.0. Preferably the silicate is a sodium silicate and most preferably sodium metasilicate (i.e. where M is sodium and m is 1.0). The silicate may contain water of hydration, for example, $Na_2O$ $SiO_2$ $9H_2O$ ($Na_2SiO_3 9H_2O$).

Sulfonated aromatic condensation polymers may discolor with time and assume a yellow tint that can be undesirable, especially depending on the color of the substrate to which the stainblocking composition is applied. Thus, a blue substrate may acquire a greenish cast. One technique for reducing the tendency to change color is to remove color formers inherent in the stainblocking material. This can be accomplished by dissolving the condensation polymer in aqueous base so as to form a solution having a pH of about 8–12, acidifying the aqueous solution to a pH of about 2 to 7.5, heating the acidified material to a temperature of about 50 to 65° C. so as to cause phase separation, removing materials which remain water-soluble after acidification and heating (e.g., by filtering, centrifuging or decanting), and dissolving the resultant water-insoluble material in aqueous base to a final pH of at least about 8, using heat as necessary to effect dissolution. Strong bases (e.g., sodium hydroxide, potassium hydroxide, lithium hydroxide) may be used. Virtually any acid is suitable, e.g. glacial acetic acid, dilute acetic acid, hydrochloric acid, sulfuric acid, oxalic acid, citric acid, or sulfamic acid. Such techniques are described in U.S. Pat. No. 4,833,009 (Marshall).

Another technique for reducing the tendency to change color is to acylate or etherify a portion of the free hydroxyl groups in the condensation polymer. However, acylating or etherifying the free hydroxyl groups can reduce the stainblocking characteristics of the condensation polymer. Thus, the portion of the free hydroxyl groups that are so treated should strike a balance between a reduced tendency to yellow and effective stainblocking. Useful acylating agents include acetic anhydride and ethylchlorofornate (conversion of about 50% to 80% of the phenolic hydroxyl groups). Chloroacetic acid is a useful etherifying agent (conversion of about 40% to 60% of the phenolic hydroxyl groups). The acylated and etherified products can be prepared by dissolving the condensation polymer in an aqueous medium having a pH of 7 or above, preferably about 10 or 11 to 13 or 14 (the actual pH depending on the acylating or etherifying agent), and at a temperature that favors acylation or etherification. The water-insoluble phase can be separated from the unwanted water solution by filtering, centrifuging, decanting, etc., and then redissolved in a hydroxyl-functional material, such as ethylene glycol, 1,3-propylene glycol, or 1,3-butylene glycol. Such techniques are described in U.S. Pat. No. 4,963,409 (Liss et al.).

In another embodiment, sulfonated aromatic polymers useful in the invention as stainblocking materials may comprise a copolymer of: (a) one or more ethylenically unsaturated aromatic monomers; and (b) one or more sulfonated ethylenically unsaturated aromatic monomers. Specific examples of ethylenically unsaturated aromatic monomers (a) include styrene, a-methylstyrene, 4-methyl styrene, stilbene, 4-acetoxystilbene, eugenol, isoeugenol, 4-allylphenol, safrole, and mixtures of these materials. Preferably, the sulfonated monomers are water soluble, which can be facilitated by providing the monomer in the form of a salt, for example, salts of alkali metals (e.g., sodium) and ammonium salts. A variety of sulfonated monomers (b) may be used including those which result from sulfonating the ortho and/or para positions of the monomers used to provide ethylenically unsaturated aromatic monomer (a). Particular examples include sodium p-styrene sulfonate, sodium vinyl p-toluene sulfonate, ammonium p-styrene sulfonate.

In the sulfonated aromatic copolymers of this embodiment, the ratio of units derived from monomer (a) to the units derived from monomer (b) is preferably about 0.1 to 10:1, more preferably about 0.9:1. Materials of this type are described in International Patent Publication No. WO 92/07131 (E. I. du Pont de Nemours and Company). The sulfonated aromatic copolymers can be conveniently prepared by a variety of free radical-initiated polymerization reactions using, for example benzoyl peroxide or 2,2'-azobis (2-methylbutyronitrile).

A second class of stainblocking materials useful in the invention are polymers of at least one or more (α-and/or β-substituted) acrylic acid monomers, these materials sometimes being referred to herein as (α-and/or β-substituted) acrylic acid polymers. The use of the parenthetical expression "α-and/or β-substituted" indicates that substitution of the α and β positions of the acrylic acid monomer is independently optional. That is, both positions may be substituted, neither position may be substituted, or either one of the two positions may be substituted without the other-position being substituted. Thus, (α-and/or β-substituted) acrylic acid monomers that are useful in preparing the polymers have the general structure $HR^1C{=}C(R)COOX$, wherein R and $R^1$ are independently selected (i.e., they may be the same or they may be different) from hydrogen, organic radicals or halogen, and X is hydrogen, an organic radical, or a cation. Organic radicals that may be used to provide R and $R^1$ include aliphatic hydrocarbons (more preferably, alkyl moieties having about 1 to 20, most preferably about 1 to 4 carbon atoms such as methyl, ethyl, propyl and butyl), which, optionally, may be sulfonated or halogenated (for example, by chlorine or fluorine); and aromatic hydrocarbons (more preferably, a phenyl group), which, optionally, may be sulfonated, halogenated (for example, by chlorine or fluorine), hydroxylated (e.g., phenol or naphthol), or combinations thereof (e.g., sulfonated phenol or sulfonated naphthol). Halogens that may be used for R and $R^1$ include chlorine and fluorine.

Organic radicals that may be used to provide the X group include both aliphatic moieties (which may be linear, branched or cyclic, and preferably containing about 1 to 10 carbon atoms), or aromatic moieties, any of which may, optionally, be halogenated, sulfonated, carboxylated, hydroxylated or ethoxylated, including cationic (e.g., sodium, potassium, ammonium, and quaternary amine) salts of these materials. Cations that may be used to provide X include sodium, potassium, ammonium, and quaternary amine.

Preferred monomers are defined by structures in which $R^1$ is hydrogen, R is an alkyl group having 1 to 4 carbon atoms, phenyl, phenol, sulfonated phenol, naphthol, chlorine, or fluorine, and X is hydrogen, an alkyl group of 1 to 10 carbon atoms, sodium, potassium or ammonium. The most preferred monomer is methacrylic acid ($R^1$ and X are hydrogen, R is methyl).

The (α-and/or β-substituted) acrylic acid polymers are preferably sufficiently water-soluble or water dispersible that uniform application and penetration of the polymer into the substrate surface can be achieved at normal application temperatures (about room temperature to 100° C.). However, excessive water solubility may reduce the treated substrate's resistance to staining by acid colorants, as well as the effectiveness of the stainblocking compositions after cleaning the substrate.

The glass transition temperature of the (α-and/or β-substituted) acrylic acid polymers can be as low as about 35° C. although higher glass transition temperatures are preferred. When polymers having high glass transition temperatures (e.g., about 90° C. or higher) are used, an additional benefit of improved soil resistance may be obtained.

The weight average molecular weight and the number average molecular weight of the (α-and/or β-substituted) acrylic acid polymers should be selected so as to provide satisfactory stain resistance, water solubility, viscosity, and ability to be handled in conventional stainblocking material manufacturing and application processes. Preferably, the lower 90 weight percent of the polymer has a weight average molecular weight of about 3,000 to 100,000, and a number average molecular weight of about 500 to 20,000, more preferably about 800 to 10,000. Generally, a larger proportion of water-soluble comonomer is preferred for high molecular weight polymers and a larger proportion of water-insoluble comonomer is preferred for low molecular weight polymers.

In some instances, however, higher molecular weight materials may be useful. For example, a water soluble copolymer of acrylic acid and methacrylic acid may have a weight average molecular weight of about 80,000 to 350,000, more preferably about 100,000 to 250,000, and most preferably about 130,000 to 200,000. In the higher weight average molecular weight copolymers, the acrylic acid preferably comprises about 1 to 20 weight percent, more preferably about 5 to 15 weight percent, while the methacrylic acid correspondingly provides about 99 to 80 weight percent, more preferably, about 95 to 85 weight percent, the sum of the acrylic acid and methacrylic acid equaling 100 weight percent.

Included within the class of (α-and/or β-substituted) acrylic acid polymers are acrylic polymers; i.e., polyacrylic acid, copolymers of acrylic acid and one or more other monomers that are copolymerizable with acrylic acid, and blends of polyacrylic acid and one or more acrylic acid copolymers. These can be produced using well-known techniques for polymerizing ethylenically unsaturated monomers. Also included within the class of (α-and/or β-substituted) acrylic acid polymers, and most preferred, are methacrylic polymers; i.e., polymethacrylic acid, copolymers of methacrylic acid and one or more other monomers that are copolymerizable with methacrylic acid, and blends of polymethacrylic acid and one or more methacrylic acid copolymers. The methacrylic polymers useful in the invention can also be prepared using methods well-known in the art for polymerization of ethylenically unsaturated monomers.

Monomers useful for copolymerization with either the acrylic acid or the methacrylic acid have ethylenic unsaturation. Such monomers include monocarboxylic acids, polycarboxylic acids, and anhydrides of the mono- and polycarboxylic acids; substituted and unsubstituted esters and amides of carboxylic acids and anhydrides; nitriles; vinyl monomers; vinylidene monomers; monoolefinic and polyolefinic monomers; and heterocyclic monomers. Specific representative monomers include acrylic acid, itaconic acid, citraconic acid, aconitic acid, maleic acid, maleic anhydride, fumaric acid, crotonic acid, cinnamic acid, oleic acid, palmitic acid, vinyl sulfonic acid, vinyl phosphonic acid, and substituted or unsubstituted alkyl and cycloalkyl esters of these acids, the alkyl or cycloalkyl groups having 1 to 18 carbon atoms such as methyl, ethyl, butyl, 2-ethylhexyl, octadecyl, 2-sulfoethyl, acetoxyethyl, cyanoethyl, hydroxyethyl, β-carboxyethyl and hydroxypropyl groups. Also included are amides of the foregoing acids, such as acrylamide, methacrylamide, methylolacrylamide, 1,1-dimethylsulfoethylacrylamide, acrylonitrile, and methacrylonitrile. Various substituted and unsubstituted aromatic and aliphatic vinyl monomers may also be used; for example, styrene, α-methylstyrene, p-hydroxystyrene, chlorostyrene, sulfostyrene, vinyl alcohol, N-vinyl pyrrolidone, vinyl acetate, vinyl chloride, vinyl ethers, vinyl sulfides, vinyl toluene, butadiene, isoprene, chloroprene, ethylene, isobutylene, and vinylidene chloride. Also useful are various sulfated natural oils such as sulfated castor oil, sulfated sperm oil, sulfated soybean oil, and sulfonated dehydrated castor oil. Particularly useful monomers include ethyl acrylate, butyl acrylate, itaconic acid, styrene, sodium sulfostyrene, and sulfated castor oil, either alone or in combination.

In the methacrylic polymers, the methacrylic acid preferably provides about 30 to 100 weight percent, more preferably about 60 to 90 weight percent, of the polymer. The optimum proportion of methacrylic acid in the polymer depends on the comonomer(s) used, the molecular weight of the copolymer, and the pH at which the material is applied. When water-insoluble comonomers such as ethyl acrylate are copolymerized with methacrylic acid, they may comprise up to about 40 weight percent of the methacrylic polymer. When water-soluble comonomers such as acrylic acid or sulfoethyl acrylate are copolymerized with methacrylic acid, the water soluble comonomers preferably comprise no more than 30 weight percent of the methacrylic polymer and preferably the methacrylic polymer also comprises up to about 50 weight percent water-insoluble monomer.

Commercially available acrylic polymers useful as stainblocking materials include Acrysol™ (available from Rohm and Haas Company) and Carbopol™ from B. F. Goodrich. Commercially available methacrylic polymers generally useful in the present invention include the Leukotan™ family of materials such as Leukotan™ 970, Leukotan™ 1027, Leukotan™ 1028, and Leukotan™ QR 1083, available from Rohm and Haas Company.

Polymers of (α-and/or β-substituted) acrylic acid monomers useful in the stainblocking compositions of the invention are described in U.S. Pat. No. 4,937,123 (Chang et al.), U.S. Pat. No. 5,074,883 (Wang), and U.S. Pat. No. 5,212,272 (Sargent et al.).

A third class of stainblocking materials useful in the invention are hydrolyzed polymers of maleic anhydride and at least one or more ethylenically unsaturated monomers. The unsaturated monomer may be an alpha-olefin monomer or an aromatic monomer, although the latter is preferred. A variety of linear and branched chain alpha-olefins may be used including alkyl vinyl ethers. Particularly useful alpha-olefins are 1-alkenes containing 4 to 12 carbon atoms, such as isobutylene, 1-butene, 1-hexene, 1-octene, 1-decene, and 1-dodecene, with isobutylene and 1-octene being preferred, and with 1-octene being most preferred. A portion of the alpha-olefins can be replaced by one or more other monomers, e.g., up to 50 wt. % of alkyl ($C_{1-4}$) acrylates, alkyl ($C_{1-4}$) methacrylates, vinyl sulfides, N-vinyl pyrrolidone, acrylonitrile, acrylamide, as well as mixture of the same.

A variety of ethylenically unsaturated aromatic monomers may be used to prepare the hydrolyzed polymers. The ethylenically unsaturated aromatic monomers may be represented by the general formula:

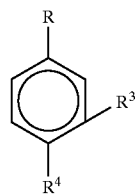

wherein
R is

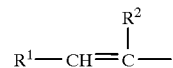

or $CH_2=CH-CH_2-$;
$R^1$ is $H-$, $CH_3-$ or

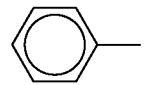

$R^2$ is $H-$ or $CH_3-$;
$R^3$ is $H-$ or $CH_3O-$;
$R^4$ is $H-$, $CH_3-$, or

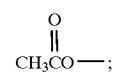

and
$R^3$ plus $R^4$ is $-CH_2-O-CH_2-O-CH_2-$.

Specific examples of ethylenically unsaturated aromatic monomers include free radically polymerizable materials such as styrene, α-methylstyrene, 4-methyl styrene, stilbene, 4-acetoxystilbene (used to prepare a hydrolyzed polymer from maleic anhydride and 4-hydroxy-stilbene), eugenol, isoeugenol, 4-allylphenol, safrole, mixtures of these materials, and the like. Styrene is most preferred. The utility of some of these materials may be improved by increasing the amount of polymerization initiator or acylating or etherifying the phenolic hydroxy groups.

In the hydrolyzed polymers, the ratio of units derived from ethylenically unsaturated monomer to units derived from maleic anhydride is about 0.4:1 to 1.3:1 when the unsaturated monomer is an alpha-olefin, and is about 1:1 to 2:1 when using an unsaturated aromatic monomer. In any event, a ratio of about 1:1 is most preferred.

Hydrolyzed polymers suitable for use in the invention may be prepared by hydrolyzing ethylenically unsaturated maleic anhydride polymers. Alkali metal hydroxides (such as potassium hydroxide, lithium hydroxide and, most often, sodium hydroxide, as well as blends of these) are suitable hydrolyzing agents. Hydrolysis can be effected in the presence of more than or less than a molar amount of the alkali metal hydroxide. The presence of an alcohol in the hydrolysis mixture should be avoided.

Hydrolyzed polymers of at least one or more alpha-olefin monomers and maleic anhydride useful in the stainblocking compositions of the invention are described in U.S. Pat. No. 5,460,887 (Pechhold). Hydrolyzed polymers of at least one or more ethylenically unsaturated aromatic monomers and maleic anhydride useful in the stainblocking compositions of the invention are described in U.S. Pat. No. 5,001,004 (Fitzgerald et al.).

Quite useful stainblocking materials may be obtained: (1) by blending together at least two or more polymers selected from among the different general classes of polymers described above; (2) by reacting together at least two or more monomers from which the different general classes of polymers are derived; (3) as the reaction product of at least one or more of the monomers from which the polymers may be derived and at least one or more of the polymers; or (4) by polymerizing at least one or more of the monomers in the presence of one or more of the polymers.

For example, one or more (α-and/or β-substituted) acrylic acid monomers may be polymerized together and, subsequent to the polymerization, blended with a sulfonated aromatic polymer. This permits both the carboxyl functionality from the (α-and/or β-substituted) acrylic acid polymer and the sulfonate functionality from the sulfonated aromatic polymer to contribute to the stainblocking properties of the composition. Particularly useful examples of such blends comprise a sulfonated aromatic condensation polymer (e.g., the condensation polymerization product of an aldehyde such as formaldehyde or acetaldehyde, a hydroxyaromatic compound such as bis(hydroxyphenyl)sulfone, phenol or napthol, and phenylsulfonic acid), and methacrylic polymer (e.g., polymethacrylic acid or a copolymer of methacrylic acid and or more of the following monomers: ethyl acrylate, butyl acrylate, itaconic acid, styrene, sodium sulfostyrene, sulfated castor oil, and acrylic acid).

The amounts of the sulfonated aromatic polymer and the (α- and/or β-substituted) acrylic acid polymer used should be sufficient to provide the desired degree of stain resistance to the substrate. Generally, when the substrate is nylon 6,6, lower application levels can be used than when the substrate is nylon 6 or wool. When the substrate is yarn heat-set under moist conditions (e.g., in an autoclave), generally higher application levels are required than when the yarn is heat-set under substantially dry conditions. Preferably, the amount of sulfonated aromatic polymer is at least about 0.1% SOF, more preferably at least about 0.2% SOF, most preferably at least about 0.4% SOF when treating nylon 6,6 carpet fiber. Generally, amounts of sulfonated aromatic polymer in excess of about 2% SOF provide little added benefit. Preferably the amount of (α- and/or β-substituted) acrylic acid polymer is at least about 0.1% SOF, more preferably at least about 0.2% SOF, most preferably at least about 0.4% SOF when treating nylon 6,6 carpet fiber. Generally amounts of (α- and/or β-substituted) acrylic acid polymer in excess of 2% SOF provide little added benefit. Preferably, the amount of sulfonated aromatic polymer used is at least about 0.2% SOF, more preferably at least about 0.4% SOF, based on the weight of the fiber when treating nylon 6 carpet fiber. Preferably, the amount of (α- and/or β-substituted) acrylic acid polymer is at least about 0.2 more, % SOF, preferably at least about 0.4% SOF when treating nylon 6 carpet fiber.

Alternatively, the (α-and/or β-substituted) acrylic acid monomer may be polymerized in the presence of the sulfonated aromatic polymer. Examples of such compositions comprise an α-substituted acrylic acid monomer (e.g., having the structure $H_2C=C(R)CO_2H$ wherein R is an alkyl group having 1 to 4 carbon atoms, phenyl, phenol, sulfonated phenol, naphthol, chlorine or fluorine) polymerized in the presence of a sulfonated aromatic condensation polymer (e.g., the condensation polymerization product of an aldehyde such as formaldehyde or acetaldehyde, a hydroxy aromatic compound such as bis(hydroxyphenyl)sulfone, phenol or napthol, and phenylsulfonic acid). Such techniques are described in U.S. Pat. No. 4,940,757 (Moss, III et al.).

A free radical polymerization initiator is added to initiate polymerization of the (α-and/or β-substituted) acrylic acid monomer in the presence of the sulfonated aromatic polymer. Useful initiators include persulfates (e.g., potassium persulfate, ammonium persulfate, or sodium persulfate), peroxides (e.g., sodium peroxide, hydrogen peroxide, benzoyl peroxide, acetyl peroxide, lauryl peroxide, cumyl peroxide, t-butyl peroxide, or t-butyl hydroperoxide), azo compounds (e.g., azo-bis-isobutryonitrile), and hydrochloride salts of azo compounds.

In another embodiment, a stainblocking material may be prepared by reacting a sulfonated hydroxy aromatic compound with isocyanate, carboxylic acid, carboxylic acid anhydride, carboxylic acid chloride, or other carboxylic acid precursor, any of which may be saturated or unsaturated. The ester formed by this reaction may then be reacted by itself or with an (α-and/or β-substituted) acrylic acid, and a free radical polymerization initiator, either in the presence of or in the absence of another sulfonated aromatic polymer. Alternatively, the ester formed from the first reaction may be homopolymerized or copolymerized with an aromatic compound in an aldehyde condensation reaction. The resulting product can be further reacted, either by itself or with an (α-and/or β-substituted) acrylic acid in the presence of a free radical polymerization initiator. Useful free-radical polymerization initiators include persulfates (e.g., ammonium persulfate, sodium persulfate, or potassium persulfate), peroxides (e.g., sodium peroxide, hydrogen peroxide, benzoyl peroxide, acetyl peroxide, lauryl peroxide, cumyl peroxide, t-butyl peroxide, or t-butyl hydroperoxide), an azo compound (e.g., azo-bis-isobutyronitrile), and peracetate (e.g., t-butyl peracetate). Such techniques are described in U.S. Pat. No. 5,310,828 (Williams et al.).

Other useful combinations include hydrolyzed polymers of ethylenically unsaturated monomer and maleic anhydride blended with sulfonated aromatic polymers and/or polymers of (α-and/or β-substituted) acrylic acid. For example, a part of the maleic anhydride (up to 30 weight %) can be replaced by acrylic or methacrylic acid. In another embodiment, a part (preferably 1–75% by weight) of the maleic anhydride can be replaced by maleimide, N-alkyl ($C_{1-4}$) maleimides, N-phenyl-maleimide, fumaric acid, itaconic acid, citraconic acid, aconitic acid, crotonic acid, cinnamic acid, alkyl ($C_{1-18}$) esters of the foregoing acids, cycloalkyl ($C_{2-8}$) esters of the foregoing acids, sulfated castor oil, or the like.

Particularly preferred blends comprise about 95 to 30 weight % of hydrolyzed polymer of ethylenically unsaturated aromatic monomer and maleic anhydride (more preferably, about 85 to 40 weight %), and about 5 to 70 weight % of a sulfonated aromatic condensation polymer, e.g., a sulfonated phenol-formaldehyde condensation polymer (more preferably, about 15 to 60 weight %), wherein the sum of these two components is 100 weight %. Such combinations are described in U.S. Pat. No. 4,833,839 (Fitzgerald et al.).

The various stainblocking materials may also be polymerized with a halogenated compound, which can be especially useful in enhancing the stain resistance of the treated substrate and/or imparting oil and water repellency thereto. Semihalogenated or perhalogenated acrylic acid and acrylate monomers are preferred; the preferred halogen being fluorine. The halogenated monomers are preferably fluorinated esters of methacrylic acid, having about 3 to 20 carbon atoms, more preferably 4 to 12 carbon atoms, and most preferably, 4 to 10 carbon atoms in the (usually terminal) fluoroalkyl group. It is recommended to copolymerize the fluorinated (meth)acrylate ester with some free methacrylic acid. Since the fluorinated esters may have low water solubility it can be helpful to include an emulsifying agent such as nonyl phenol, an ethoxylated oleic ester, or sorbitan monooleate in the stainblocking composition. The emulsifying agent is used in an amount sufficient to provide a stable emulsion, typically about 0.1 to 8%. Typical fluorochemicals are produced by condensation of a fluorinated alcohol or fluorinated primary amine with a suitable anhydride or isocyanate, for example, N-ethyl perfluorooctyl-sulfonamidoethanol and toluene diisocyanate reacted in a 2:1 molar ratio.

Organoborane Amine Complexes

Organoborane amine complexes useful in the invention preferably have the following general structure:

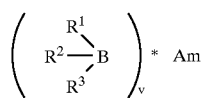

where $R^1$ is an alkyl group having 1 to 18 (preferably 1 to 10) carbon atoms, and $R^2$ and $R^3$ are independently selected from alkyl groups having 1 to 18 (preferably 1 to 10) carbon atoms and phenyl-containing groups. More preferably, $R^1$, $R^2$ and $R^3$ are alkyl groups having 1 to 5 carbon atoms such as methyl, ethyl, n-propyl, iso-propyl, n-butyl, iso-butyl, and pentyl. By "independently selected" it is meant that $R^2$ and $R^3$ may be the same or that they may be different. $R^1$ may be the same as $R^2$ or $R^3$, or it may be different. Preferably $R^1$, $R^2$ and $R^3$ are the same. Most preferred are complexes in which $R^1$, $R^2$ and $R^3$ are each butyl groups.

The value of v is selected so as to provide an effective ratio of nitrogen atoms to boron atoms in the complex. The nitrogen atom to boron atom ratio in the complex is broadly about 0.5:1 to 4:1, preferably about 1:1 to 4:1. More preferably, however, the ratio is about 1:1 to 2:1, even more preferably about 1:1 to 1.5:1 and most preferably about 1:1. A nitrogen atom to boron atom ratio of less than 1:1 could leave free organoborane, a material that tends to be pyrophoric. At nitrogen atom to boron atom ratios in excess of 2:1, the practical utility of the complex in, for example, a stainblocking composition diminishes as the amount of complex that must be employed to generate a useful stain-blocking composition becomes larger.

"Am" represents the amine portion of the complex and may be provided by a wide variety of materials having at least one amine group, including blends of different amines. The amine may be any primary or secondary monoamine, a polyamine containing a primary or secondary amine, or ammonia. Useful monoamines may be represented by the following general formula:

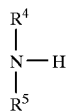

where $R^4$ and $R^5$ are hydrogen or alkyl groups having 1 to 18 carbon atoms, more preferably 1 to 10 carbon atoms, most preferably 1 to 4 carbon atoms (so as to provide, for example, n-octylamine, diethylamine, and dibutylamine), and

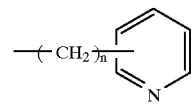

where n is 1 or 2.

More preferably, however, "Am" represents a polyamine (i.e., having more than one amine group), including blends of different polyamines. Even more preferably, the polyamine has two to four amine groups, although polyamines with two amine groups (i.e., diamines) are most preferred.

In one embodiment, the polyamine may be described by the structure $H_2N—R^6—NH_2$ in which $R^6$ is a divalent, organic radical comprised of an alkylene, arylene or alky-lenearylene group. Preferred among these materials are alkane diamines which may be branched or linear, and having the general structure

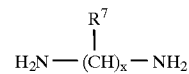

in which x is a whole number greater than or equal to 1, more preferably about 2 to 12, and each $R^7$ is independently hydrogen or an alkyl group. Particularly preferred examples of alkane diamines include 1,2-ethanediamine, 1,3-propanediamine, 1,5-pentanediamine, 1,6-hexanediamine, 1,12-dodecanediamine, 2-methyl-1,5-pentane diamine, 3-methyl-1,5-pentane diamine, and isomers of these materials. While alkane diamines are preferred, other alkylene polyamines may be used such as triethylene tetraamine and diethylene triamine.

The polyamine may also be provided by a polyoxyalkylenepolyamine. Polyoxyalkylenepolyamines useful in making complexes are preferably selected from the following structures:

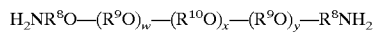

(i.e., polyoxyalkylene diamines); or

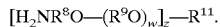

$R^8$, $R^9$ and $R^{10}$ are alkylene groups having 1 to 10 carbon atoms and may be the same or may be different. Preferably, $R^8$ is an alkylene group having 2 to 4 carbon atoms such as ethylene, n-propylene, iso-propylene, n-butylene or iso-butylene. Preferably, $R^9$ and $R^{10}$ are alkylene groups having 2 or 3 carbon atoms such as ethylene, n-propylene or iso-propylene. $R^{11}$ is the residue of a polyol used to prepare the polyoxyalkylenepolyamine (i.e., the organic structure that remains if the hydroxyl groups are removed). $R^{11}$ may be branched or linear, and substituted or unsubstituted (although substituents should not interfere with oxyalkylation reactions).

The value of w is $\geq 1$, more preferably about 1 to 150, and most preferably about 1 to 20. Structures in which w is 2, 3 or 4 are particularly useful too. The values of x and y are both $\geq 0$. The value of z is >2, more preferably 3 or 4 (so as to provide, respectively, polyoxyalkylene triamines and tetraamines). It is preferred that the values of w, x, y and z be chosen such that the resulting complex is a liquid at room temperature, as this simplifies the handling and mixing thereof. Usually, the polyoxyalkylenepolyamine is itself a liquid. For the polyoxyalkylenepolyamine, molecular weights of less than about 5,000 may be used, although molecular weights of about 1,000 or less are more preferred, and molecular weights of about 250 to 1,000 are most preferred.

Examples of particularly preferred polyoxyalkylenepolyamines include polyethyleneoxidediamine, polypropyleneoxidediamine, polypropyleneoxidetriamine, diethyleneglycolpropylenediamine, triethyleneglycolpropylenediamine, polytetramethyleneoxidediamine, polyethyleneoxide-co-polypropyleneoxidediamine, and polyethyleneoxide-co-polypropyleneoxidetriamine.

Examples of suitable commercially available polyoxyalkylenepolyamines include various Jeffamines™ from Huntsman Chemical Company such as the D, ED, and EDR series diamines (e.g., D400, D-2000, D-5000, ED-600, ED-900, ED-2001, and EDR-148), and the T series triamines (e.g., T-403), as well as H221 from Union Carbide Company.

The polyamine may also comprise the condensation reaction product of diprimary amine-terminated material (i.e., the two terminal groups are primary amine), and one or more materials containing at least two groups reactive with primary amine (referred to herein at times as "difunctional primary amine-reactive material"). Such materials are preferably substantially linear so as to have the general structure E-(L-E)$_u$-L-E in which each E is the residue of the diprimary amine-terminated material and each L is a linking group that is the residue of the difunctional primary amine-reactive material. (By "residue" is meant those portions of the diprimary amine-terminated material and the difunctional primary amine-reactive material that remain after reaction to form the polyamine adduct.)

The E and L groups are independently selected. That is, each E group may be the same or may be different, as may each L group, although it is preferred that each E group be the same and that each L group be the same. The majority (more than 50%) of the terminal groups in the polyamine should be primary amine.

The value of u is selected so as to provide both a polyamine and a complex of useful viscosity. Preferably both the polyamine and the complex are liquid at room temperature. Consequently, the value of u may be greater than or equal to zero, although a value of about 0 to 5 is more preferred, and a value of 0 or 1 is most preferred.

The diprimary amine-terminated material may be alkylene diprimary amine, arylene diprimary amine, alkylenearylene diprimary amine, a polyoxyalkylenediamine (such as those described above), or mixtures thereof. Useful alkylene diprimary amines include those having the structure $NH_2$—$R^{12}$—$NH_2$ wherein $R^{12}$ is a linear or branched alkylene group having about 1 to 12 carbon atoms such as 1,3-propane diamine, 1,6-hexanediamine, and 1,12-dodecanediamine. Other useful alkylene diprimary amines include triethylene tetraamine and diethylene triamine. Examples of useful arylene diprimary amines include 1,3- and 1,4-phenylene diamine as well as the various isomers of diaminonaphthalene. An example of a useful alkylenearylene diprimary amine is m-tetramethylxylylene diamine.

Difunctional primary amine-reactive materials contain at least two groups reactive with primary amine. The reactive groups may be different, but it is preferred that they be the same. Difunctional primary amine-reactive materials having a functionality of 2 (i.e., two groups reactive with primary amine) are preferred. Useful difunctional primary amine-reactive materials may be generally represented by the formula Y—$R^{13}$—Z wherein $R^{13}$ is a divalent organic radical such as an alkylene, arylene or alkylenearylene group or combination thereof, and Y and Z are groups reactive with primary amine and which may be the same or may be different. Examples of useful Y and Z groups reactive with primary amine include carboxylic acid (—COOH), carboxylic acid halide (—COX, where X is a halogen, for example chlorine), ester (—COOR), aldehyde (—COH), epoxide

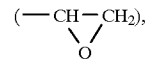

amine alcohol (—$NHCH_2OH$), and acrylic

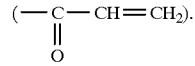

Suitable carboxylic acid-functional materials are preferably those which are useful in forming polyamides, for example, cyclohexane-1,4-dicarboxylic acid and dicarboxylic acids having the structure HOOC—$R^{14}$—COOH in which $R^{14}$ is a linear alkylene group having about 2 to 21 carbon atoms. Aromatic dicarboxylic acids (e.g., terephthalic and isophthalic acids) may be used as can alkylenearylene dicarboxylic acids, especially in combination with alkylene dicarboxylic acids.

Useful carboxylic halide acid-functional materials and ester-functional materials include those which are obtained by derivatizing the above-described carboxylic acid-functional materials.

Suitable aldehyde-functional materials include alkylene, arylene and alkylenearylene dialdehydes such as oxalaldehyde, malonaldehyde, succinaldehyde, adipaldehyde, 2-hydroxyhexanedial, phthalaldehyde, 1,4-benzenediacetaldehyde, 4,4-(ethylenedioxy)dibenzaldehyde, and 2,6-naphthalene dicarbaldehyde. Most preferred are glutaraldehyde and adipaldehyde.

Suitable epoxide-functional materials include aliphatic, cycloaliphatic and glycidyl ether diepoxides. Most preferred are the diepoxides based upon bis-phenol A and bis-phenol F.

Useful acrylic-functional materials are preferably diacrylates and a wide variety of such materials may be successfully employed in the invention.

Also useful as polyamines are heterocyclic diamines in which both amine groups are within the heterocyclic structure. Useful examples of such materials may be represented by the general structure

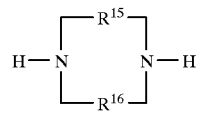

in which $R^{15}$ and $R^{16}$ are alkylene groups which may be the same or which may be different. Preferably $R^{15}$ and $R^{16}$ cooperate to form, with the two nitrogen atoms, a 5 to 8-membered ring. Most preferably, $R^{15}$ and $R^{16}$ are each —$CH_2$—$CH_2$— radicals so as to yield piperazine.

Also useful are heterocyclic tertiary polyamines such as triethylenediamine.

The organoborane amine complex may be readily prepared using known techniques. Typically, the amine is combined with the organoborane in an inert atmosphere with slow stirring. The amine and the organoborane may be combined neat or in the presence of an inert organic solvent (e.g., an aprotic ether such as tetrahydrofuran or diethyl ether). An exotherm is often observed and cooling of the mixture is, therefore, recommended. The use of an inert organic solvent may be helpful in moderating the exotherm. If the ingredients have a high vapor pressure, it is desirable to keep the reaction temperature below about 70 to 80° C. Once the materials have been well mixed the complex is permitted to cool to room temperature. No special storage conditions are required although it is preferred that the complex be kept in a capped vessel in a cool, dark location.

The organoborane amine complex is included in the stainblocking composition in an effective amount, by which is meant an amount sufficient to increase the stain resistance of a substrate treated with the stainblocking composition (as compared to a substrate that has been treated with the same stainblocking composition but which does not contain the organoborane amine complex), but without leaving insolubles that could cause undesirable spot staining. Small amounts of complex may not result in a sufficient increase in stain resistance, while large amounts may be more difficult to solubilize and could cause undesirable spot staining.

The actual stain resistance effective amount of complex will be influenced by a variety of factors including the type of substrate, the type of stainblocking material, the concentration at which the stainblocking material is applied (% SOF), and the pH at which the stainblocking composition is applied to the substrate. Within these guidelines, a stain resistance effective amount of organoborane complex is about 1 to 70 parts per 100 parts of stainblocking material, more preferably about 5 to 20 parts.

Additives

A wide variety of additives may be usefully incorporated into the stainblocking compositions of the invention for the purpose of achieving a desired effect. For example, including a water soluble, divalent metal salt in the stainblocking composition may improve its effectiveness in imparting stain resistance to a substrate. The water soluble, divalent metal salt also can reduce the amount of stainblocking material that needs to be included in the stainblocking composition, as well as broaden the pH range at which a substrate may be treated. Useful divalent metal salts include water soluble inorganic and organic salts of metals such as magnesium, barium, calcium and zinc. Inorganic salts include chlorides, sulfates and nitrates of these metals. Organic salts include acetates and formates of these metals. Preferred are magnesium sulfate, magnesium chloride and magnesium acetate. Mixtures of two or more salts can also be used. The divalent metal salts are preferably used in an amount of at least 1% SOF, more preferably at least 1.5% SOF, most preferably at least 2% SOF. However, metal salt amounts in excess of 5% SOF generally do not provide any appreciable increase in stain resistance. Such techniques are described in U.S. Pat. No. 4,875,901 (Payet et al.)

Surfactants and/or hydrotropes may be included to improve the solubility of the various stainblocking composition ingredients in each other, to promote better wetting of a substrate that is to be treated with the stainblocking composition, or for other benefits. Useful surfactants may be ionic or nonionic while useful hydrotropes are usually anionic.

Common ionic surfactant families include sodium and potassium salts of straight chain fatty acids (soaps), sodium and potassium salts of coconut oil fatty acids, sodium and potassium salts of tall oil acids, amine salts, acylated polypeptides, linear alkylbenzene sulfonates, higher alkyl benzene sulfonates, aromatic sulfonates, petroleum sulfonates, paraffin sulfonates (secondary n-alkanesulfonates), olefin sulfonates, sulfosuccinate esters, alkylnaphthylsulfonates, isothioates, sulfuric acid ester salts, including sulfated linear primary alcohols, sulfonated phenols, sulfated polyoxyethylenated alkyl phenols, sulfated . polyoxyethylenated straight chain alcohols, sulfated triglyceride oils, phosphoric and polyphosphoric acid esters, fluoroaliphatic materials such as fluoroaliphatic anionics (e.g., carboxylates, sulfonates, sulfates and phosphates), long chain amines and their salts, diamines and polyamines and their salts, quaternary ammonium salts, polyoxyethylenated long-chain amines, quaternized polyoxyethylenated long chain amines, and amine oxides. Also included are zwitterionic surfactants such as N-alkyl-β-iminodipropionic acids, imidazoline carboxylates, N-alkylbetaines, amine oxides, sulfobetaines and sultaines.

Common nonionic surfactants include polyoxyethylenated alkylphenols (such as the polyoxyethylenated derivatives of nonylphenol, octylphenol, and dodecylphenol), alcohol ethoxylates, polyoxyethylenated polypropylene glycol, polyoxyethylenated mercaptans, long chain carboxylic acid esters, glycerol, polyglycerol esters of natural fatty acids, polyoxyethylenated sorbitol esters, polyoxyethylenated fatty acid esters, alkanolamides, alkanolamine fatty acid condensates, tertiary acetylenic glycols, polyoxyethylenated silicones and alkylpolyglycosides.

Useful hydrotropes include sodium benzene sulfonate, sodium xylene sulfonate, sodium naphthalene sulfonate, and sodium cumene sulfonate.

Usefully, an (α-and/or β-substituted) acrylic acid monomer may be polymerized in the presence of an aromatic sulfonic compound. Possible monomers include aromatic sulfonic acids (e.g., those described above such as toluene sulfonic acid, benzene sulfonic acid, dodecylbenzene sulfonic acid, cumene sulfonic acid and xylene sulfonic acid) or a salt (e.g, potassium, sodium or ammonium) of these acids. Such techniques are described in U.S. Pat. No. 5,212,272 (Sargent et al.).

Ultra-violet absorbing agents can be included in the stainblocking composition to yield a product that provides a protective coating against ultra-violet radiation. Any aromatic ultra-violet absorbing molecule is suitable.

The halogenated materials described earlier for polymerizing with the stainblocking materials can, alternatively, be physically blended with the stainblocking composition to provide oil and water repellency to a treated substrate.

Substrates

The stainblocking compositions of the invention are useful in imparting stain resistance to a wide variety of fibrous substrates that contain polyamide linkages, including fabrics, textiles and, especially, carpet. Polyamide linkages are found in a wide variety of fibers such as wool, silk, natural leather, synthetic leather and nylon. Nylon is particularly preferred and comprises a synthetic polyamide prepared by the polycondensation of a dicarboxylic acid and a diamine, such as adipic acid and hexamethylene diamine (nylon 6,6). Nylon can also be produced from a cyclic amide such as caprolactam (nylon 6).

Preparation and Application of the Stainblocking Compositions

The stainblocking compositions of the invention are easily prepared by physically blending the stainblocking material and the organoborane amine complex. Typically they are prepared in the form of an aqueous solution. The stainblocking material and the organoborane amine complex may be combined before using the stainblocking composition and then shipped or stored in this manner until needed, or they may be retained in separate containers and combined shortly before the stainblocking composition is applied to a substrate. The latter case may be regarded as a two-part stainblocking composition or system comprising the stainblocking material in one part and the organoborane amine complex in the second part. As used herein, a stainblocking composition refers to both two-part systems and one-part systems (i.e., the stainblocking material and the organoborane amine complex having already been combined).

The pH of the aqueous stainblocking composition is preferably below 7, more preferably below about 5, and most preferably below about 3. One of the advantages afforded by the present invention is the ability of the stainblocking composition to impart stain resistance even when the stainblocking composition is applied at a relatively high pH (i.e., about 4.5). In addition to providing a more environmentally acceptable stainblocking composition, the need for special handling requirements before shipping, using or disposing of the stainblocking composition can be reduced or eliminated.

The stainblocking composition may be applied to the fibrous substrate in a variety of ways including the use of dyeing techniques conventionally used to dye fibrous substrates, immersing, padding, foaming, or spin finishing. Best results are usually achieved when the stainblocking compositions are applied under hot (e.g., near boiling) conditions to promote good absorption by the substrate, followed by drying the substrate. The stainblocking compositions are particularly useful in conjunction with wool and nylon carpet, and many of the application techniques have been specifically developed for use in such environments, though they can be adapted for use with fibrous substrates other than carpet.

For example, the stainblocking composition can be applied from an aqueous exhaust bath such as is used in beck dyeing of carpet. The stainblocking composition can be added to the aqueous dye bath solution and exhausted concurrently with the dye. Generally, the dye bath is maintained at a temperature at or near the boiling point for a period of 10 to 90 minutes or more to effect co-exhaustion of the dye and stainblocking composition. The substrate is then dried.

Alternatively, the stainblocking composition can be added to the aqueous dye bath after exhaustion of the dye, or the dye bath can be drained and fresh water added prior to the addition of the stainblocking composition. Generally, the bath is maintained at a temperature at or near boiling for a period of time sufficient to exhaust the stainblocking composition, usually 10 to 90 minutes. The substrate is then dried.

The stainblocking composition can be applied during continuous dyeing, such as with Kuster™ or Otting™ carpet dyeing equipment. The stainblocking composition can be added directly to the aqueous dye solution and the solution is conventionally applied to the substrate. Alternatively, the stainblocking composition can be applied during a wetting out step prior to application of the dye. The substrate is then dried.

The stainblocking composition can also be applied to a fibrous substrate by a padding operation. This can be done as a separate step or in conjunction with the application of various conventional finishes such as wetting agents, softeners, and leveling agents. After application of the stainblocking composition the fibrous substrate is dried. Other suitable methods include application by low-pressure padding such as can be accomplished with Kuster Flexnip™ equipment, spray applicators such as those available from Otting International, or dip boxes which need not be equipped with moisture reduction apparatus such as squeeze rolls. In these methods, the stainblocking composition is generally applied from an aqueous solution at ambient or elevated (e.g., about 60 to 90° C.) conditions, followed by steaming from 15 to 180 seconds, then drying.

The stainblocking composition can also be applied by foam techniques which are well-known in the carpet industry. Generally, the stainblocking composition is applied from an aqueous solution which further can contain a foaming agent, such as those typically used in foam dyeing.

The stainblocking composition can also be applied to carpet during shampooing operations that use, for example, scrubbing machines and steam or hot water cleaning machines.

In another approach, the stainblocking composition can be applied by spin finishing during the melt spinning process used to prepare polyamide fibers. The stainblocking composition is applied to a fibrous substrate by a kiss-roll or other metered applicator and then the substrate is heat-set. The stainblocking composition typically includes lubricating oils for the fibers as well as dispersants for the oils. In the event that subsequent processing of the fibers (e.g., heat-setting or steaming) results in a slight reduction in stainblocking performance, such loss can be restored to the fiber by including a small amount (about 0.1 to 3% SOF) in the dye liquor (i.e., the liquid containing the dye for dyeing the fiber).

While the performance of the stainblocking compositions can be improved by, subsequent to applying the stainblocking composition, steaming the fibrous substrate for a time and at a temperature sufficient set the composition onto the fibers, the stainblocking compositions of the invention can be usefully applied at room temperature without using steam or heat.

The amount of stainblocking composition that is applied to the fibrous substrate (measured as a percentage of the solids on the fibrous substrate, % SOF) is effective to impart stain resistance to the treated substrate. The actual amount will vary depending on the type of substrate, the conditions under which it is applied, the level of stain resistance desired, the type of stainblocking material, and the type and amount of organoborane amine complex. Within these guidelines, the stainblocking composition is typically applied at a level of at least about 0.1% SOF, although amounts in excess of about 3% SOF are generally not used for cost reasons. More preferred stainblocking composition amounts are applied at about 0.2 to 2% SOF, with about 0.5 to 1% SOF being most preferred.

The invention will be more fully appreciated by referring to the following non-limiting examples. Various abbreviations and tradenames are used in the examples and are defined according to the following schedule.

| Abbreviation or Tradename | Description |
|---|---|
| cm | Centimeter |
| FX-369 ™ | 33.9% solids aqueous stainblocking material comprising a sulfonated aromatic compound, available from 3M Company |
| FX-661 ™ | 29.5% solids aqueous solution stainblocking material that comprises a blend of sulfonated aromatic compound and α-substituted acrylic polymer, available from 3M Company |
| g | Gram |

| Abbreviation or Tradename | Description |
|---|---|
| GX-1 | Stainkleer ™ GX-1, a 34.1% solids aqueous solution stainblocking material that comprises α-substituted acrylic polymer, available from Dyetech Corp. |
| hr | Hour |
| kg | Kilogram |
| m | Meter |
| mg | Milligrams |
| min | Minute |
| ml | Milliliter |
| N6 | Nylon 6 |
| N6, 6 | Nylon 6, 6 |
| oz | Ounce |
| SR-300 | Stainblocking material comprising a blend of sulfonated aromatic compound, and hydrolyzed polymer of unsaturated aromatic monomer and maleic anhydride (styrene/maleic anhydride), available from Dupont Co. |
| TEB-HMDA | Organoborane amine complex based on triethylborane (TEB) and hexamethylene diamine (HMDA) |
| TBB-H221 | Organoborane amine complex based on tributylborane (TBB) and H221, a polyoxyalkylenediamine commercially available from Union Carbide Corporation |
| TBB-HMDA | Organoborane amine complex based on tributylborane (TBB) and hexamethylene diamine (HMDA) |
| TBB-PIP | Organoborane amine complex based on tributylborane (TBB) and piperazine (PIP) |
| Transition III ™ | Nylon 6,6 carpet, "Blue Moon" color, 36 oz/yd (1.2 kg/m$^2$), prepared from Monsanto Company's Ultron ™ fiber and available from Burlington Industries |
| wt | Weight |
| yd | Yard |
| % SOF | % solids on fiber, the theoretical concentration at which a stainblocking material was applied to a substrate |

Test Procedures

Unless specified otherwise in the examples, two procedures were used to prepare substrate samples for testing: a plastic bag application procedure, and a simulated flex-nip application procedure. A color analyzer staining test was used to evaluate the ability of the samples to resist staining by an acid dye.

Plastic Bag Application Procedure

The plastic bag application procedure is a convenient laboratory technique for applying a measured amount of stainblocking composition to a small sample by immersion.

More specifically, a carpet sample measuring approximately 5 inches×4 inches (13 cm×10 cm) was treated by immersion for a period of time specified in the examples by placing the sample in a resealable plastic bag containing an aqueous stainblocking composition. The amount of stainblocking material used in the aqueous stainblocking composition was that which gave the desired theoretical percent by weight of total solids that were to be applied to the fibrous carpet sample (% SOF), with the assumption that 100% of the stainblocking material would be retained on the carpet. This amount of stainblocking material was dissolved or dispersed in deionized water (along with any organoborane amine complex) to form the aqueous stainblocking composition, the pH of which was adjusted to a level reported in the examples using 10% aqueous sulfamic acid (10 g of solid acid in 90 g of water). The weight of the aqueous stainblocking composition in the resealable plastic bag was approximately 4.5 times the weight of the carpet sample.

After immersion, the carpet sample was rinsed twice with 1 liter aliquots of deionized water to remove excess stainblocking composition, spun to dampness using a Bock Centrifugal Extractor, and air-dried overnight at room temperature. The actual % SOF will be understood to be somewhat less than the theoretical % SOF due to the removal of residual, excess stainblocking composition upon rinsing. The % SOF values reported in the examples are the theoretical values.

Simulated Flex-Nip Application Procedure

This procedure simulated the flex-nip operations used by commercial carpet mills to apply stainblocking composition to carpet.

More specifically, a carpet sample measuring approximately 5 inches×4 inches (13 cm×10 cm) was immersed in deionized water at room temperature until dripping wet. Water was extracted from the sample by spinning in a Bock Centrifugal Extractor until the sample was damp. The damp carpet sample was then steamed for 2 minutes at atmospheric pressure, 90–100° C., and 100% relative humidity in an enclosed steam chamber.

After steaming, the carpet sample was allowed to cool to near room temperature, and the aqueous stainblocking composition was applied by placing the sample, carpet fiber side down, into a glass tray containing the stainblocking composition. The stainblocking composition contained sufficient stainblocking material to give the desired theoretical % SOF and was prepared by dissolving or dispersing the stainblocking material (and any organoborane amine complex) in deionized water and adjusting the pH to the level reported in the examples using 10% aqueous sulfamic acid, as described in the plastic bag application procedure. The weight of the aqueous stainblocking composition in the glass tray was approximately 4.5 times the weight of the carpet sample. The carpet sample absorbed the entire volume of stainblocking composition over about 1 to 2 minutes.

Then, unless specified otherwise in the examples, the wet, stainblocking composition-treated carpet sample was steamed a second time for 2 minutes (using the conditions and equipment described above), immersed briefly in a 5-gallon bucket half full with deionized water, rinsed thoroughly under a deionized water stream to remove residual, excess stainblocking composition, spun to dampness using the centrifugal extractor, rerinsed with deionized water, spun to dampness again, and allowed to air-dry overnight at room temperature.

Color Analyzer Staining Test

Unless specified otherwise in the examples, a dry carpet sample that had been first treated with a stainblocking composition was stained for 2 minutes by immersing the carpet sample in an excess amount (about 800 ml to 1 liter) of a solution of 0.007% (wt) of Red Dye FD&C #40 in deionized water with pH adjusted to 2.8 with 10% aqueous sulfamic acid. The dye solution was warmed to a temperature specified in the examples, usually about 55–70 ° C. The treated and stained carpet sample was then immersed briefly in a 5-gallon bucket half full with deionized water, followed by rinsing under a stream of deionized water until the water ran clear. The wet carpet sample was then extracted to dampness using a Bock Centrifugal Extractor and was air-dried overnight at room temperature.

The degree of staining was determined numerically using a Minolta Chroma Meter™ compact tristimulus color analyzer. The color analyzer measured the reflected red stain color autochromatically on the red-green coordinate as a "delta a" (Δa) value as compared to the color of an unstained and untreated carpet sample. Measurements reported in the tables below are given to one place following the decimal point and represent the average of 3 measurements, unless stated otherwise. A greater Δa reading indicates a greater amount of staining from the red dye.

Unless stated otherwise in the examples, the amount of organoborane amine complex is expressed in parts (reported to two significant digits), which refers to parts per 100 parts of stainblocking material.

EXAMPLE 1 AND COMPARATIVE EXAMPLE C1

Example 1 and Comparative Example C1 illustrate the ability of nylon 6,6 carpet treated with a stainblocking composition that comprised a blend of sulfonated aromatic condensation polymer and (α-and/or β-substituted) acrylic polymer, with and without an organoborane amine complex, to resist staining by aqueous acid red dye under a variety of time and temperature exposure conditions.

EXAMPLE 1

A stainblocking composition was prepared by blending in a jar 1.7 g (0.5 g solids) of FX-661, 25 g of deionized water, and 40 mg of neat TBB-HMDA complex. The TBB-HMDA complex for example 1 and for the following examples was prepared by combining the organoborane and the amine in an inert atmosphere with slow stirring. The mixture was cooled as needed to moderate any exotherm, and when the reaction was complete was cooled to room temperature.

Transition III™ carpet was cut into approximately 5.5 cm×4.0 cm samples. The samples were soaked in the stainblocking composition for 16 hours at room temperature, rinsed with 1 liter of deionized water for approximately one minute, pressed to dampness by hand between paper towels, and allowed to air-dry overnight at room temperature.

The dried carpet samples were stained by immersion in an aqueous solution of 0.007% (wt) Red Dye FD&C #40 adjusted to a pH of 2 with 10% (wt) aqueous sulfamic acid for 3 minutes at temperatures of 22° C., 50° C. or 80° C. Carpet sample dye immersion tests were also conducted for 2.5 hours at room temperature (about 25° C.). The degree of staining was visually and qualitatively estimated based on single samples (no repetitions) and with the results presented in Table 1.

Comparative Example C1

Example 1 was repeated except that the stainblocking composition did not include TBB-HMDA complex. The degree of staining was visually and qualitatively estimated with the results presented in Table 1.

TABLE 1

| Ex. | Amount of Complex (mg) | Amount of Staining After Temperature/Time | | | |
|---|---|---|---|---|---|
| | | 22° C./3 min | 22° C./2.5 hr | 50° C./2.5 hr | 80° C./2.5 hr |
| C1 | 0 | no stain | slight pink | pink to deep pink | deep red |
| 1 | 40 | no stain | no stain | no stain | light pink, blotchy |

The data in Table 1 show that when the staining test was run for 3 minutes at room temperature, no staining occurred with or without the organoborane amine complex. However, when the room temperature staining test was extended to 2.5 hours, the carpet treated with the stainblocking composition of the invention that included organoborane amine complex showed no staining, while Comparative Example 1, which excluded the organoborane amine complex, was lightly stained. The 50° C. and 80° C. staining results show an even more marked difference between using and not using the organoborane amine complex in the stainblocking composition. These examples demonstrate that improved stain resistance can be imparted to nylon 6,6 carpet by treating with a commercially available stainblocking material that has been supplemented with an organoborane amine complex. These examples also show that effective stain resistance can be obtained with a room temperature treatment.

EXAMPLES 2–7 AND COMPARATIVE EXAMPLE 2

Examples 2–7 and Comparative Example 2 illustrate how the stain resistance of nylon 6,6 carpet is affected by the amount of organoborane amine complex in the stainblocking composition.

More specifically, the plastic bag application procedure was used to treat Transition III™ (nylon 6,6 carpet at 1.1% SOF with a 2.5 pH stainblocking composition that comprised FX-661™ stainblocking material and varying amounts (parts) of TBB-HMDA complex as specified in Table 2 below. The immersion time was approximately 22 hours. The complex was added to the FX-661™ as an acetone solution having a complex concentration of 40 mg/ml.

For each treated carpet sample there were two cycles of dye staining (each at about 67±3° C.) and rinsing. The carpet samples were allowed to air-dry overnight at room temperature before the second staining and rinsing cycle. Δa values were measured after each cycle using the procedure described above and with the results reported below in Table 2.

TABLE 2

| Example | Amount of Complex (parts) | Δa Value After Cycle 1 | Δa Value After Cycle 2 |
|---|---|---|---|
| 2 | 32 | −0.2 | 5.8 |
| 3 | 21 | −0.3 | 4.8 |
| 4 | 11 | −0.1 | 3.2 |
| 5 | 5.3 | 0.3 | 6.3 |
| 6 | 2.7 | 0.4 | 8.1 |
| 7 | 1.1 | 1.7 | 13.9 |
| C2 | 0.0 | 3.8 | 18.9 |

Table 2 shows that the ability of the treated carpet sample to resist staining increases with larger amounts of organoborane amine complex, but that even relatively small amounts significantly improve the stain resistance of the carpet.

EXAMPLES 8–15 AND COMPARATIVE EXAMPLES C3–C6

Examples 8–15 and Comparative Examples C3–C6 illustrate the durability of the stainblocking compositions of the invention to repeated staining cycles. Using the simulated flex-nip application procedure, Transition III™ nylon 6,6 carpet was treated at 1.1% SOF with a stainblocking composition that comprised a blend of FX-661™ and TBB-HMDA complex. In Examples 12–15 and Comparative Examples C5 and C6 there was a one hour delay after the stainblocking composition was applied and before the sample was steamed for the second time. The stainblocking composition pH, and amount (parts) of organoborane amine complex in the composition were varied as specified in Table 3 below.

For each treated carpet sample there were four cycles of dye staining (each at 65±5° C.) and rinsing. Δa values were measured after each cycle using the procedure described earlier and with the results reported below in Table 3. The carpet samples were allowed to air-dry overnight at room temperature before each staining and rinsing cycle.

TABLE 3

| Ex. | pH* | Time Delay Before Second Steaming | Amount of Complex (Parts) | Δa Value After Cycle | | | |
|---|---|---|---|---|---|---|---|
| | | | | 1 | 2 | 3 | 4 |
| C3 | 2.5 | — | 0.0 | 0.9 | 2.6 | 4.7 | 6.5 |
| C4 | 3.5 | — | 0.0 | 2.4 | 6.8 | 13.7 | 15.5 |
| 8 | 2.5 | — | 11 | 0.0 | 0.2 | 1.0 | 1.8 |
| 9 | 3.5 | — | 11 | 5.1 | 7.3 | 10.0 | 12.0 |
| 10 | 2.5 | — | 32 | 0.2 | 1.4 | 1.5 | 3.8 |
| 11 | 3.5 | — | 32 | 2.3 | 3.7 | 6.0 | 7.2 |
| C5 | 2.5 | One hour | 0.0 | 0.4 | 1.2 | 2.2 | 3.1 |
| C6 | 3.5 | One hour | 0.0 | 9.9 | 16.1 | 19.1 | 21.8 |
| 12 | 2.5 | One hour | 11 | -0.1 | 0.2 | 0.9 | 1.5 |
| 13 | 3.5 | One hour | 11 | 1.8 | 2.4 | 3.2 | 4.7 |
| 14 | 2.5 | One hour | 32 | -0.2 | -0.1 | 0.5 | 1.0 |
| 15 | 3.5 | One hour | 32 | 1.5 | 2.8 | 4.3 | 5.3 |

*of the stainblocking composition

The data in Table 3 show that when the carpet was treated at a pH of 2.5 with a stainblocking composition that included organoborane amine complex and with no time elapsed between application of the stainblocking composition and the second steaming (Examples 8 and 10), Δa values for all four staining cycles were lower than when the stainblocking composition did not include organoborane amine complex (Comparative Example C3). When the second steaming was delayed for one hour, lower Δa values for all four staining cycles were achieved with or without the organoborane amine complex, but staining was less evident when the stainblocking composition included the organoborane amine complex (Examples 12 and 14 vs. Comparative Example C5).

At a pH of 3.5 and with no time elapsed between application of the stainblocking composition and the second steaming, a marked lowering of Δa values was observed for all four staining cycles at the higher complex level (Example 11) compared to when the stainblocking composition did not include the organoborane amine complex (Comparative Example C4), but was observed only for the third and fourth staining cycles at the lower complex level (Example 9). When the second steaming was delayed for one hour, much lower Δa values were observed when the stainblocking composition included an organoborane amine complex (Examples 13 and 15 vs. Comparative Example C6).

EXAMPLES 16–23 AND COMPARATIVE EXAMPLES C7–C10

The simulated flex-nip application procedure was used to apply a stainblocking composition comprising FX-369™ and TBB-HMDA complex to Transition III™ nylon 6,6 carpet. The concentration at which the stainblocking composition was applied, the amount (parts) of organoborane amine complex in the composition, and the pH of the stainblocking composition were varied as shown below in Table 4. (An "unadjusted" pH means that no aqueous sulfamic acid was used. The pH was about 6.) Staining was done at 65±3° C. and the Δa color values of the carpet samples were measured using the procedure described earlier (Cycle 1). After allowing each carpet sample to air-dry overnight at room temperature, the staining procedure was repeated at 65±3° C. and a second set of Δa values was measured (Cycle 2). The results are presented in Table 4.

TABLE 4

| Ex. | % SOF | pH* | Amount of Complex (parts) | Δa Value After Cycle | |
|---|---|---|---|---|---|
| | | | | 1 | 2 |
| C7 | 0.55% | 2.5 | 0.0 | 4.8 | 6.5 |
| C8 | 0.55% | unadjusted | 0.0 | 21.6 | 24.7 |
| 16 | 0.55% | 2.5 | 21 | -0.1 | 0.2 |
| 17 | 0.55% | unadjusted | 21 | 1.9 | 3.6 |
| 18 | 0.55% | 2.5 | 64 | 0.2 | 0.5 |
| 19 | 0.55% | unadjusted | 64 | 2.2 | 4.2 |
| C9 | 1.1% | 2.5 | 0.0 | 0.5 | 1.3 |
| C10 | 1.1% | unadjusted | 0.0 | 3.2 | 5.8 |
| 20 | 1.1% | 2.5 | 11 | -0.3 | 0.1 |
| 21 | 1.1% | unadjusted | 11 | -0.1 | 0.6 |
| 22 | 1.1% | 2.5 | 32 | -0.2 | -0.1 |
| 23 | 1.1% | unadjusted | 32 | 0.8 | 1.8 |

*of the stainblocking composition

The data in Table 4 again show the benefit in lowering Δa values when an organoborane amine complex is incorporated into the stainblocking composition. The benefit is especially apparent under the most stringent conditions of low amounts of stainblocking material and unadjusted pH (Examples 17 and 19 compared to Comparative Example C8).

EXAMPLES 24–31 AND COMPARATIVE EXAMPLE C11

The plastic bag application procedure was used to apply a stainblocking composition comprising FX-661™ and various organoborane amine complexes to Transition III™ nylon 6,6 carpet, as shown below in Table 5 along with the amount (parts) of the complex solids that was employed. No organoborane amine complex was added to the stainblocking material in Comparative Example C11. The organoborane amine complexes were dissolved in acetone to a concentration of 40 mg/ml to facilitate addition to the stainblocking material. The stainblocking composition was applied at a concentration of 0.55% SOF, and at a pH of 2.5, with a carpet sample immersion time in the aqueous composition of 15 hours. Staining was done at room temperature (about 20–25° C.) for 3 hours and the Δa color values of the carpet samples were measured using the procedure described earlier. The results are presented in Table 5.

TABLE 5

| Ex. | Organoborane Amine Complex | Amount of Complex (parts) | Δa Value |
|---|---|---|---|
| 24 | TEB-HMDA | 5.3 | 7.9 |
| 25 | TEB-HMDA | 21 | 14.0 |
| 26 | TBB-PIP | 5.3 | 32.2 |
| 27 | TBB-PIP | 21 | 12.9 |
| 28 | TBB-H221 | 5.3 | 29.3 |
| 29 | TBB-H221 | 21 | 21.7 |
| 30 | TBB-HMDA | 5.3 | 27.8 |
| 31 | TBB-HMDA | 21 | 17.0 |
| C11 | None used | 0.0 | 32.7 |

The data in Table 5 show the efficacy of three different organoborane amine complexes in enhancing the properties of FX-661™ stainblocking material. Trialkylboranes in which the three alkyl groups are the same and have from 1 to 5 carbon atoms are preferred. Various amines may be used to complex the organoborane including linear alkyl diamines, heterocyclic diamines, and polyoxyalkylenediamines. Larger amounts of complex gave better performance.

EXAMPLES 32–43 AND COMPARATIVE EXAMPLES C12–C17

The simulated flex-nip application procedure was used to apply stainblocking compositions at a pH of 2.5 to different types of nylon carpet. For Examples 32–39 and Comparative Examples C12–C15, Transition III™ nylon 6,6 carpet was used (identified in the examples as N6,6). For Examples 40–43 and Comparative Examples C16–C17, nylon 6 carpet, off-white style #51699, 38 oz/yd, prepared by Shaw Industries from fiber available from BASF Corp., was used (identified in the examples as N6). The stainblocking material that was used, the concentration at which the stainblocking composition was applied, and the amount (parts) of organoborane amine complex in the composition were varied as shown below in Table 6. The organoborane amine complex was TBB-HMDA. Staining was done at 64±1° C. and the Δa color values of the carpet samples were measured using the procedure described earlier. The results are presented in Table 6.

TABLE 6

| Ex. | Stainblocking Material | % SOF | Amount of Complex (parts) | Carpet Type | Δa Value |
|---|---|---|---|---|---|
| C12 | GX-1 | 0.55% | 0.0 | N6,6 | 23.9 |
| 32 | GX-1 | 0.55% | 21 | N6,6 | 6.6 |
| 33 | GX-1 | 0.55% | 64 | N6,6 | 7.9 |
| C13 | GX-1 | 1.1% | 0.0 | N6,6 | 20.3 |
| 34 | GX-1 | 1.1% | 11 | N6,6 | 2.6 |
| 35 | GX-1 | 1.1% | 32 | N6,6 | 2.4 |
| C14 | FX-661 | 0.55% | 0.0 | N6,6 | 1.5 |
| 36 | FX-661 | 0.55% | 21 | N6,6 | 0.3 |
| 37 | FX-661 | 0.55% | 64 | N6,6 | 1.9 |
| C15 | FX-661 | 1.1% | 0.0 | N6,6 | 1.5 |
| 38 | FX-661 | 1.1% | 11 | N6,6 | 0.0 |
| 39 | FX-661 | 1.1% | 32 | N6,6 | −0.1 |
| C16 | GX-1 | 1.1% | 0.0 | N6 | 38.4 |
| 40 | GX-1 | 1.1% | 11 | N6 | 26.6 |
| 41 | GX-1 | 1.1% | 32 | N6 | 29.4 |
| C17 | FX-661 | 1.1% | 0.0 | N6 | 6.6 |
| 42 | FX-661 | 1.1% | 11 | N6 | 2.4 |
| 43 | FX-661 | 1.1% | 32 | N6 | 3.0 |

The data in Table 6 show that except for Example 37 which showed some spot staining, the use of organoborane amine complex in combination with either Stainkleer™ GX-1 or FX-66 1 stainblocking material, significantly improved the stain resistance of both nylon 6 and nylon 6,6 carpet. Stainblocking compositions using Stainkleer™ GX-1 and either 21 or 64 parts organoborane amine complex, even when applied at 0.55% SOF (Examples 32 and 33), showed far superior stain resistance to stainblocking compositions that included 1.1% SOF Stainkleer™ GX-1 but no organoborane amine complex (Comparative Example C13). The best overall Δa values were achieved with FX-661™ stainblocking material and the organoborane amine complex.

EXAMPLES 44–47 AND COMPARATIVE EXAMPLES C18–C19

The simulated flex-nip application procedure was used to apply stainblocking compositions at a concentration of 1.1% SOF and at a pH of 2.5 to both Transition III™ nylon 6,6 carpet and the off-white style #51699 nylon 6 carpet from Examples 40–43 and Comparative Examples C16–C17. The stainblocking composition comprised SR-300™ styrene/maleic anhydride stainblocking material and TBB-HMDA organoborane amine complex. The amount (parts) of organoborane amine complex in the composition was varied as shown below in Table 7. Staining was done at 65±1° C. and the Δa color values of the carpet samples were measured using the procedure described earlier. The results are presented in Table 7.

TABLE 7

| Ex. | Complex | Carpet Type | Δa Value |
|---|---|---|---|
| C18 | 0.0 | N6,6 | 2.3 |
| 44 | 11 | N6,6 | 0.4 |
| 45 | 32 | N6,6 | 0.9 |
| C19 | 0.0 | N6 | 50.2 |
| 46 | 11 | N6 | 43.3 |
| 47 | 32 | N6 | 44.2 |

The data in Table 7 show that on nylon 6,6 carpet, stainblocking compositions that use styrene/maleic anhydride and organoborane amine complex exhibit less staining than stainblocking compositions that do not include an organoborane amine complex (Examples 44 and 45 vs. Comparative Example C18). The same trend was observed on nylon 6 carpet, although the overall performance, with or without organoborane amine complex was less.

EXAMPLES 48–65 AND COMPARATIVE EXAMPLES C20–C37

Examples 48–65 and Comparative Examples C20–C37 illustrate the stain resistance of nylon 6,6 carpet treated with various stainblocking compositions after simulated shampooing under mild or strong alkalinity conditions (pH of 8 or 10, respectively). The simulated flex-nip application procedure was used to apply a stainblocking composition comprising different stainblocking materials and TBB-HMDA complex to Transition III™ carpet. The type of stainblocking material, the amount (parts) of organoborane amine complex in the composition, and the pH of the stainblocking composition were varied as shown below in Table 8. The stainblocking compositions were applied at 0.55% SOF.

The carpet samples were then stained and evaluated using one of three test methods: Test A, Test B or Test C.

Test A—Staining Without Prior Shampoo Exposure

A 0.007% (wt) solution of Red Dye FD&C #40 in deionized water was made, adjusting the solution pH to 2.8 with aqueous sulfamic acid. Meanwhile, a 400 ml plastic beaker with the bottom cut out was placed bottom side down in the middle of a dry carpet sample to which a stainblocking composition had been previously applied. 25–30 ml of the dye solution was then poured at room temperature inside the beaker and onto the carpet, forming a circular stain. After 6 hours, the stained carpet sample was thoroughly rinsed under a stream of deionized water until the stream ran clear, extracted to dampness using a Bock Centrifugal Extractor, and air-dried overnight. Δa values for this staining procedure (Cycle 1) were determined according to the earlier described color analyzer staining test. The carpet samples were then allowed to air-dry overnight at room temperature, and the same staining procedure was repeated at the same location on the carpet sample (Cycle 2).

Test B—Staining After Simulated Shampoo Exposure at a pH of 8

Carpet samples previously treated with a stainblocking composition were immersed for 5 minutes in a simulated shampoo solution containing 57 g of Duponol™ WAQE surfactant (available from Witco Corp.) in 3,800 g of deionized water, with pH adjusted to 8 using an aqueous solution of trisodium phosphate. The samples were then thoroughly rinsed under a stream of deionized water, extracted to dampness using a Bock Centrifugal Extractor, air-dried overnight at room temperature, and subjected to the two staining cycles described in Test A.

Test C—Staining After Simulated Shampoo Exposure at a pH of 10

Test C used the procedure described in Test B except that the pH of the simulated shampoo solution was adjusted to 10.

The Δa values for the stained carpets after cycle 1 and cycle 2 are presented in Table 8.

TABLE 8

| Ex. | Stainblocking Material | pH* | Amounts of Complex (parts) | Test Method | Δa Value After Cycle 1 | Cycle 2 |
|---|---|---|---|---|---|---|
| C20 | FX-661 | 2.5 | 0.0 | A | 0.4 | 0.7 |
| C21 | FX-661 | 2.5 | 0.0 | B | 3.0 | 11.1 |
| C22 | FX-661 | 2.5 | 0.0 | C | 30.2 | 37.0 |
| 48 | FX-661 | 2.5 | 21 | A | −0.6 | 0.1 |
| 49 | FX-661 | 2.5 | 21 | B | 1.0 | 5.0 |
| 50 | FX-661 | 2.5 | 21 | C | 16.2 | 28.2 |
| C23 | FX-661 | 3.5 | 0.0 | A | 3.2 | 7.9 |
| C24 | FX-661 | 3.5 | 0.0 | B | 15.1 | 24.9 |
| C25 | FX-661 | 3.5 | 0.0 | C | 28.9 | 36.1 |
| 51 | FX-661 | 3.5 | 21 | A | 1.2 | 3.2 |
| 52 | FX-661 | 3.5 | 21 | B | 3.4 | 10.2 |
| 53 | FX-661 | 3.5 | 21 | C | 13.6 | 24.7 |
| C26 | FX-369 | 2.5 | 0.0 | A | 1.5 | 2.7 |
| C27 | FX-369 | 2.5 | 0.0 | B | 1.4 | 2.9 |
| C28 | FX-369 | 2.5 | 0.0 | C | 2.3 | 5.6 |
| 54 | FX-369 | 2.5 | 21 | A | 0.5 | 1.2 |
| 55 | FX-369 | 2.5 | 21 | B | 0.2 | 1.2 |
| 56 | FX-369 | 2.5 | 21 | C | 0.8 | 3.1 |
| C29 | FX-369 | 3.5 | 0.0 | A | 4.0 | 8.1 |
| C30 | FX-369 | 3.5 | 0.0 | B | 2.4 | 6.3 |
| C31 | FX-369 | 3.5 | 0.0 | C | 6.6 | 17.0 |
| 57 | FX-369 | 3.5 | 21 | A | 0.4 | 1.6 |
| 58 | FX-369 | 3.5 | 21 | B | 0.2 | 2.0 |
| 59 | FX-369 | 3.5 | 21 | C | 1.3 | 7.4 |
| C32 | SR-300 | 2.5 | 0.0 | A | 0.4 | 0.9 |
| C33 | SR-300 | 2.5 | 0.0 | B | 3.8 | 9.3 |
| C34 | SR-300 | 2.5 | 0.0 | C | 5.0 | 13.2 |
| 60 | SR-300 | 2.5 | 21 | A | −0.3 | 0.2 |
| 61 | SR-300 | 2.5 | 21 | B | 1.4 | 4.4 |
| 62 | SR-300 | 2.5 | 21 | C | 3.8 | 12.0 |
| C35 | SR-300 | 3.5 | 0.0 | A | 22.2 | 31.6 |
| C36 | SR-300 | 3.5 | 0.0 | B | 20.8 | 30.5 |
| C37 | SR-300 | 3.5 | 0.0 | C | 24.8 | 35.0 |
| 63 | SR-300 | 3.5 | 21 | A | 8.2 | 15.2 |
| 64 | SR-300 | 3.5 | 21 | B | 5.0 | 14.6 |
| 65 | SR-300 | 3.5 | 21 | C | 12.4 | 27.8 |

*of the stainblocking composition.

The data in Table 8 show that nylon 6,6 carpet treated with stainblocking compositions applied at either pH 2.5 or 3.5 and that comprised an organoborane amine complex and any of a variety stainblocking materials consistently showed improved stain resistance when compared to the same carpet treated with a stainblocking composition that did not include an organoborane amine complex. This improvement was still observed even after the carpet was given a simulated shampooing at a pH of 8 or 10, indicating that the stainblocking compositions of the invention have improved durability. It has been reported that shampooing a carpet can reduce the efficiency of a previously applied stainblocking composition.

EXAMPLES 66–81 AND COMPARATIVE EXAMPLES C38–C45

The effect of stainblocking composition pH was evaluated in Examples 66–81 and Comparative Examples C38–C45.

The simulated flex-nip application procedure was used to apply a stainblocking composition comprising SR-300™ stainblocking material and TBB-HMDA complex to Transition III™ nylon 6,6 carpet. The amount (parts) of organoborane amine complex in the composition, the concentration at which the stainblocking composition was applied, and the pH of the stainblocking composition were varied as shown below in Table 9. Staining was done at 72±1° C. and the Δa color values of the carpet samples were measured using the procedure described earlier. The results are presented in Table 9.

TABLE 9

| Ex. | % SOF | pH* | Amount of Complex (parts) | Δa Value |
|---|---|---|---|---|
| C38 | 0.55% | 2.5 | 0.0 | 8.0 |
| 66 | 0.55% | 2.5 | 21 | 2.4 |
| 67 | 0.55% | 2.5 | 64 | 5.3 |
| C39 | 0.55% | 3.5 | 0.0 | 46.0 |
| 68 | 0.55% | 3.5 | 21 | 27.3 |
| 69 | 0.55% | 3.5 | 64 | 15.6 |
| C40 | 0.55% | 4.5 | 0.0 | 48.0 |
| 70 | 0.55% | 4.5 | 21 | 40.4 |
| 71 | 0.55% | 4.5 | 64 | 32.4 |
| C41 | 0.55% | 6.5 | 0.0 | 49.0 |
| 72 | 0.55% | 6.5 | 21 | 48.3 |
| 73 | 0.55% | 6.5 | 64 | 47.4 |
| C42 | 1.1% | 2.5 | 0.0 | 3.6 |
| 74 | 1.1% | 2.5 | 11 | −0.3 |
| 75 | 1.1% | 2.5 | 32 | −0.3 |
| C43 | 1.1% | 3.5 | 0.0 | 32.8 |
| 76 | 1.1% | 3.5 | 11 | 4.5 |
| 77 | 1.1% | 3.5 | 32 | 3.4 |
| C44 | 1.1% | 4.5 | 0.0 | 23.8 |
| 78 | 1.1% | 4.5 | 11 | 41.7 |
| 79 | 1.1% | 4.5 | 32 | 14.5 |
| C45 | 1.1% | 6.5 | 0.0 | 46.2 |
| 80 | 1.1% | 6.5 | 11 | 47.8 |
| 81 | 1.1% | 6.5 | 32 | 43.0 |

*of the stainblocking composition

The data in Table 9 show that when the stainblocking compositions included an organoborane amine complex amine, improved stain resistance was realized at pHs of 2.5, 3.5 and 4.5 at either 0.55% or 1.1% SOF. The improvement at pH of 2.5 is notable as SR-300™ is known to perform very well by itself at this pH.

EXAMPLES 82–89 AND COMPARATIVE EXAMPLES C46–C53

Examples 82–89 and Comparative Examples C46–C53 illustrate that the stainblocking composition of the invention can impart improved stain resistance to wool carpet.

The simulated flex-nip application procedure was used to apply a stainblocking composition comprising various stainblocking materials and TBB-HMDA complex to level loop, off-white/light beige color wool carpet (Cobblestone style CM0190, 44–50 oz./yd$^2$, manufactured by Shaw Industries). The weight of the stainblocking composition that was applied to the carpet sample was about 5 times the weight of the carpet sample. The stainblocking material that was used, the concentration at which the stainblocking composition was applied, the amount (parts) of organoborane amine complex in the composition, and the pH of the stainblocking composition were varied as shown below in Table 10. Staining was done at room temperature (about 25° C.) for at least 8 hours and the Δa color values of the carpet samples were measured using the procedure described earlier. The results are presented in Table 10.

TABLE 10

| Ex. | Stainblocking Material | % SOF | pH* | Amount of Complex (parts) | Δa Value |
|---|---|---|---|---|---|
| C46 | FX-661 | 0.55% | 2.5 | 0.0 | 24.6 |
| 82 | FX-661 | 0.55% | 2.5 | 21 | 23.6 |
| C47 | FX-661 | 0.55% | 3.5 | 0.0 | 25.1 |
| 83 | FX-661 | 0.55% | 3.5 | 21 | 20.4 |
| C48 | FX-661 | 1.1% | 2.5 | 0.0 | 24.4 |
| 84 | FX-661 | 1.1% | 2.5 | 11 | 21.7 |
| C49 | FX-661 | 1.1% | 3.5 | 0.0 | 22.9 |
| 85 | FX-661 | 1.1% | 3.5 | 11 | 19.9 |
| C50 | FX-369 | 0.55% | 2.5 | 0.0 | 22.9 |
| 86 | FX-369 | 0.55% | 2.5 | 21 | 18.2 |
| C51 | FX-369 | 0.55% | 3.5 | 0.0 | 21.9 |
| 87 | FX-369 | 0.55% | 3.5 | 21 | 16.4 |
| C52 | SR-300 | 0.55% | 2.5 | 0.0 | 22.8 |
| 88 | SR-300 | 0.55% | 2.5 | 21 | 21.4 |
| C53 | SR-300 | 0.55% | 3.5 | 0.0 | 22.4 |
| 89 | SR-300 | 0.55% | 3.5 | 21 | 20.5 |

*of the stainblocking composition

The data in Table 10 show that wool carpet treated with various stainblocking compositions that include an organoborane amine complex consistently showed improved stain resistance as compared to stainblocking compositions that did not include an organoborane amine complex.

EXAMPLES 90–94 AND COMPARATIVE EXAMPLES C54–C58

Examples 90–94 and Comparative Examples C54–C58 illustrate the durability of the stainblocking compositions of the invention to repeated staining cycles under conditions of varying stainblocking composition pH. Using the simulated flex-nip application procedure, Transition III™ nylon 6,6 carpet was treated at 0.55% SOF with a stainblocking composition that comprised a blend of FX-661™ and either 21 parts or 0.0 parts TBB-HMDA complex.

For each treated carpet sample there were two cycles of dye staining and rinsing. The first staining cycle was for 5 hours at room temperature (about 25° C.). The second staining cycle was for 21 hours at room temperature. Δa values were measured after each cycle using the procedure described earlier and with the results reported below in Table 11. The carpet samples were allowed to air-dry overnight at room temperature before each staining and rinsing cycle.

TABLE 11

| Ex. | pH* | Amount of Complex (parts) | Δa Value After Cycle 1 | Δa Value After Cycle 2 |
|---|---|---|---|---|
| 90 | 2.0 | 21 | −1.3 | 0.3 |
| C54 | 2.0 | 0.0 | 0.2 | 1.9 |
| 91 | 2.5 | 21 | −1.0 | 0.6 |
| C55 | 2.5 | 0.0 | 0.2 | 2.1 |
| 92 | 3.5 | 21 | 0.5 | 6.2 |
| C56 | 3.5 | 0.0 | 2.5 | 8.9 |
| 93 | 4.5 | 21 | 10.3 | 20.8 |
| C57 | 4.5 | 0.0 | 24.7 | 32.9 |
| 94 | 6.5 | 21 | 30.9 | 37.1 |
| C58 | 6.5 | 0.0 | 32.3 | 38.8 |

*of the stainblocking composition

These examples show that stainblocking compositions that include an organborane amine complex consistently outperform stainblocking compositions that do not include an organoborane amine complex, across a wide range of stainblocking compositions pHs. In general, stainblocking compositions with a lower pH provide better stain resistance than stainblocking compositions at a higher pH.

COMPARATIVE EXAMPLES C59–C64

Comparative Examples C59–C64 were prepared to evaluate the inherent stainblocking characteristics of the organoborane amine complex. Comparative Examples C59–C62 were prepared following the plastic bag application procedure except that the plastic bag did not include any stainblocking material. The plastic bag contained TBB-HMDA complex dispersed in 76.5 g deionized water, the amount of complex being specified in Table 12 below in milligrams. The pH of the dispersion is also shown in Table 12 where the "unadjusted" pH (i.e., no addition of sulfamic acid) was about 6. Also shown in Table 12 is the immersion time for the Transition III™ nylon 6,6 carpet sample in the dispersion of the complex.

In Comparative Example C63, the carpet sample was not treated with organoborane amine complex but was stained. In Comparative Example C64, the carpet sample was not treated with organoborane amine complex and was not stained. It was used as the reference for determining Δa values and is given a Δa value of "0" in Table 12. Staining of all samples was done at 60±3° C. and the Δa color values were measured using the procedure described above and with the results presented in Table 12. The values reported for examples C59–C64 are an average of six measurements.

TABLE 12

| Ex. | pH* | Amount of Complex (mg) | Immersion Time (hr) | Δa Value |
|---|---|---|---|---|
| C59 | 2.5 | 20 | 24 | 44.1 |
| C60 | 2.5 | 60 | 24 | 45.2 |
| C61 | unadjusted | 20 | 24 | 42.3 |
| C62 | unadjusted | 60 | 24 | 44.0 |
| C63 | N/A | 0.0 | 0 | 44.0 |
| C64 | N/A | 0.0 | 0 | 0.0 |

N/A = Not applicable
*of the organoborane amine solution or dispersion

Table 12 shows that the organoborane amine complexes do not independently impart stain resistance to fibrous substrates treated therewith.

EXAMPLES 95–96 AND COMPARATIVE EXAMPLES C65–C66

A polymethacrylic acid stainblocking material was prepared as follows: to a 1 pint bottle were added 25 g of methacrylic acid, 75 g of deionized water, and 1.25 g of ammonium persulfate. The bottle was purged with nitrogen and placed in a Launder-o-meter™ at 65° C. for at least 12 hours (i.e., overnight). The polymerized sample was then removed and placed in a jar for use in the stainblocking composition.

Stainblocking compositions comprising the polymethacrylic acid and varying amounts (parts) of TBB-HMDA complex (as specified below in Table 13) were applied at pH 2.5 to Transition III™ nylon 6,6 carpet at varying % SOF levels using the simulated flex-nip application procedure. The carpet samples were then stained at room temperature (about 25° C.) for at least 8 hours and the Δa values were measured using the procedure described previously and with the results shown below in Table 13.

TABLE 13

| Example | % SOF | Amount of Complex (parts) | Δa Value |
|---------|-------|---------------------------|----------|
| C65 | 0.55 | 0.0 | 3.1 |
| 95 | 0.55 | 21 | 2.5 |
| C66 | 1.1 | 0.0 | 2.7 |
| 96 | 1.1 | 11 | 2.4 |

The data show that methacrylic polymers can be successfully used as stainblocking materials in accordance with the invention. Examples in which the stainblocking composition included an organoborane amine complex gave improved stain resistance over corresponding examples that did not include the complex. Higher treatment levels also gave improved performance.

EXAMPLES 97–98 AND COMPARATIVE EXAMPLES C67–C68

Examples 97–98 and Comparative Examples C67–C68 illustrate how the stain resistance of nylon 6,6 carpet is affected by the level of (α-and/or β-substituted) acrylic polymer stainblocking material and organoborane amine complex in the stainblocking composition.

In these examples the simulated flex-nip application procedure was used to apply stainblocking composition to Transition III™ carpet. The stainblocking composition was prepared as follows. To a 1 liter reaction vessel equipped with a reflux condenser, a mechanical stirrer, and a thermometer, were charged 3.2 parts (i.e., parts by weight) sulfated castor oil and 71.7 parts deionized water. This solution was heated to 95° C. and to this solution were added simultaneously dropwise 16.5 parts methacrylic acid and 1.7 parts ammonium persulfate in 6.9 parts water over a period of about 2 hours. The reaction mixture was further stirred for 3 hours at 90° C. and then cooled to 50° C. The resultant copolymer solution was partially neutralized to pH 4.3 by the addition of 20% aqueous sodium hydroxide. The resultant product contained 21.4% copolymer solids. The amount (parts) of TBB-HMDA complex was varied as shown below in Table 14 as is the % SOF level. The pH of the stainblocking composition was 2.5. Staining was done at room temperature (about 25° C.) for at least 8 hours and the Δa color values were measured using the procedure described above and with the results presented in Table 14.

TABLE 14

| Example | % SOF | Amount of Complex (parts) | Δa Value |
|---------|-------|---------------------------|----------|
| C67 | 0.55 | 0.0 | 1.9 |
| 97 | 0.55 | 21 | 0.9 |
| C68 | 1.1 | 0.0 | 1.1 |
| 98 | 1.1 | 11 | 1.0 |

The examples show that stainblocking compositions based on an (α-and/or β-substituted) acrylic polymer and an organoborane amine complex gave better performance than stainblocking compositions that did not include a complex. Higher treatment levels also gave improved performance.

The present invention has now been described with reference to several embodiments thereof. It will be apparent to those skilled in the art that many changes can be made in the embodiments described without departing from the spirit and scope of the invention. Hence, the scope of the present invention shall not be limited to the compositions, articles and methods described herein, but only by compositions, articles and methods described by the language of the accompanying claims and equivalents thereof.

The embodiments for which an exclusive property or privilege is claimed are defined as follows:

1. An aqueous stainblocking system useful for imparting stain resistance to fibrous substrates, comprising:
   (a) stain blocking material selected from the group consisting of sulfonated aromatic polymers, polymers derived from at least one (α- and/or β-substituted) acrylic acid monomer, hydrolyzed copolymers of at least one ethylenically unsaturated monomer and maleic anhydride, blends of at least two or more of these polymers, reaction products of at least two of the monomers from which these polymers may be derived, and materials obtained by polymerizing at least one or more of the monomers from which these polymers may be derived in the presence of one or more of the polymers; and
   (b) a complex of organoborane and amine.

2. A stainblocking system according to claim 1 wherein the sulfonated aromatic polymer is selected from the group consisting of a condensation polymer of an aldehyde and a sulfonated aromatic compound, and a subsequently sulfonated condensation polymer of an aldehyde and an aromatic compound.

3. A stainblocking system according to claim 2 wherein the aldehyde is formaldehyde.

4. A stainblocking system according to claim 2 wherein the sulfonated aromatic compound is selected from the group consisting of bis(hydroxy phenyl sulfone), hydroxy benzenesulfonic acid, hydroxynaphthalenesulfonic acid, sulfonated 4,4'-dihydroxydiphenylsulfone, and blends thereof.

5. A stainblocking system according to claim 4 wherein the aldehyde is formaldehyde.

6. A stainblocking system according to claim 1 wherein the sulfonated aromatic polymer is the sulfonation product of a polymer comprising the reaction product of:
   (a) an aldehyde selected from the group consisting of formaldehyde, acetaldehyde, and blends thereof;
   (b) a hydroxy aromatic compound selected from the group consisting of bis(hydroxyphenyl) sulfone, phenol, naphthol, and blends thereof and
   (c) optionally, phenyl sulfonic acid.

7. A stainblocking system according to claim 1 wherein the sulfonated aromatic polymer is a copolymer of ethylenically unsaturated aromatic monomer and sulfonated ethylenically unsaturated aromatic monomer.

8. A stainblocking system according to claim 7 wherein the ethylenically unsaturated aromatic monomer is styrene.

9. A stainblocking system according to claim 1 wherein the polymer derived from at least one monomers (α-and/or β-substituted) acrylic acid monomer is selected from the group consisting of polyacrylic acid, copolymers of acrylic acid and one or more other monomers that are copolymerizable with acrylic acid, and blends of polyacrylic acid and acrylic acid copolymer.

10. A stainblocking system according to claim 1 wherein the polymer derived from at least one monomers (α-and/or β-substituted) acrylic acid monomer is selected from the group consisting of polymethacrylic acid, copolymers of methacrylic acid and one or more other monomers that are copolymerizable with methacrylic acid, and blends of polymethacrylic acid and methacrylic acid copolymer.

11. A stainblocking system according to claim 1 wherein the hydrolyzed copolymer of at least one monomers ethylenically unsaturated monomer and maleic anhydride is a hydrolyzed copolymer of styrene and maleic anhydride.

12. A stainblocking system according to claim 1 wherein the stainblocking material comprises:
(a) a polymer derived from at least one monomers (α-and/or β-substituted) acrylic acid monomer; and
(b) a sulfonated aromatic polymer.

13. A stainblocking system according to claim 12 wherein the polymer derived from at least one monomer (α-and/or β-substituted) acrylic acid monomer is selected from the group consisting of polymethacrylic acid, copolymers of methacrylic acid and one or more other monomers that are copolymerizable with methacrylic acid, and blends of polymethacrylic acid and methacrylic acid copolymer.

14. A stainblocking system according to claim 13 wherein the sulfonated aromatic polymer is a condensation polymer of an aldehyde and a sulfonated aromatic compound.

15. A stainblocking system according to claim 1 wherein the organoborane of the complex has the structure

wherein $R^1$ is an alkyl group having 1 to 18 carbon atoms, and $R^2$ and $R^3$ are independently selected from the group consisting of alkyl groups having 1 to 18 carbon atoms and phenyl-containing groups.

16. A stainblocking system according to claim 15 wherein $R^1$, $R^2$ and $R^3$ are each independently selected from the group consisting of alkyl groups having 1 to 5 carbon atoms.

17. A stainblocking system according to claim 1 wherein the amine of the complex is selected from the group consisting of primary monoamines, secondary monoamines, polyamines containing a primary amine or a secondary amine, and ammonia.

18. A stainblocking system according to claim 1 wherein the amine of the complex is a polyamine selected from the group consisting of:

(a) heterocyclic diamines having the structure

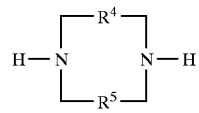

wherein $R^4$ and $R^5$ are alkylene groups that cooperate to form with the two nitrogen atoms a 5 to 8-membered ring;

(b) diamines having the structure $H_2N-R^6-NH_2$ in which $R^6$ is a divalent, organic radical comprised of an alkylene, arylene or alkylenearylene group;

(c) polyoxyalkylenepolyamines having either the structure $H_2NR^7(O)-(R^8O)_w-(R^9O)_x-(R^8O)_y-R^7NH_2$ or the structure $[H_2NR^7O-(R^8O)_w]_z-R^{10}$ wherein
  (i) $R^7$, $R^8$ and $R^9$ are each independently selected from the group consisting of alkylene groups having 1 to 10 carbon atoms;
  (ii) $R^{10}$ is the residue of a polyol used to prepare the polyoxyalkylenepolyamine;
  (iii) the value of w is $\geq 1$;
  (iv) the value of x is $\geq 0$;
  (iv) the value of y is $\geq 0$; and
  (vi) the value of z is $\geq 2$;

(d) the condensation reaction product of a diprimary amine-terminated material and a material containing at least two groups reactive with primary amine; and (e) heterocyclic tertiary polyamines.

19. A stainblocking system according to claim 1 wherein the amount of the organoborane amine complex in the stainblocking composition is about 5 to 20 parts per 100 parts of stainblocking material.

* * * * *

UNITED STATES PATENT AND TRADEMARK OFFICE
CERTIFICATE OF CORRECTION

PATENT NO. : 5,952,409
DATED : September 14, 1999
INVENTOR(S) : Gail S. Boardman and Larry D. Boardman It is certified that error appears in the above-identified patent and that said Letters Patent is hereby corrected as shown below:

Title page,
Item [56], under "FOREIGN PATENT DOCUMENTS", the following reference should be added -- 42-14318 Japan --;

Column 2,
First line, "Triethlboron" should read -- Triethylboron --;

Column 3,
Line 46, "thereof" should read -- thereof. --;

Column 8,
Line 55, "(Biedern ann)," should read -- Biedermann), --;

Column 9,
Line 36, "i" should read -- 1 --;
Line 56, "substrate.) should read -- substrate). --;

Column 10,
Line 52, "a-methylstyrene" should read -- α-methylstyrene --;

Column 19,
Line 16, "D400." should read -- D-400, --;

Column 31,
Line 45, "FX-66 1" should read -- FX-661™ --;

Column 35,
Line 62, "organborane" should read -- organoborane --;

Column 38,
Line 7, before "stain" insert -- a --;
Lines 53, 60 and 67, after "one" delete -- monomers --;

UNITED STATES PATENT AND TRADEMARK OFFICE
CERTIFICATE OF CORRECTION

PATENT NO. : 5,952,409
DATED : September 14, 1999
INVENTOR(S) : Gail S. Boardman and Larry D. Boardman It is certified that error appears in the above-identified patent and that said Letters Patent is hereby corrected as shown below:

Column 39,
Lines 5 and 9, after "one" delete -- monomers --; and

Column 40,
Line 27, "$\geq 2$" should read -- $>2$ --.

Signed and Sealed this

Fifth Day of March, 2002

Attest:

JAMES E. ROGAN
Attesting Officer
Director of the United States Patent and Trademark Office